(12) United States Patent
Kim et al.

(10) Patent No.: US 12,538,351 B2
(45) Date of Patent: Jan. 27, 2026

(54) METHOD AND DEVICE FOR TRANSMITTING FRAME THROUGH DETERMINATION OF CHANNEL EXPANSION IN BROADBAND WIRELESS COMMUNICATION NETWORK

(71) Applicants: Hyundai Motor Company, Seoul (KR); Kia Corporation, Seoul (KR); Korea National University of Transportation Industry-Academic Cooperation Foundation, Chungju-Si (KR)

(72) Inventors: Yong Ho Kim, Incheon (KR); Han Seul Hong, Seoul (KR)

(73) Assignees: Hyundai Motor Company, Seoul (KR); Kia Corporation, Seoul (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 596 days.

(21) Appl. No.: 17/607,567

(22) PCT Filed: Apr. 29, 2020

(86) PCT No.: PCT/KR2020/005815
§ 371 (c)(1),
(2) Date: Oct. 29, 2021

(87) PCT Pub. No.: WO2020/222584
PCT Pub. Date: Nov. 5, 2020

(65) Prior Publication Data
US 2022/0210829 A1  Jun. 30, 2022

(30) Foreign Application Priority Data

Apr. 30, 2019 (KR) .................. 10-2019-0051002
May 13, 2019 (KR) .................. 10-2019-0055739
(Continued)

(51) Int. Cl.
*H04W 72/02* (2009.01)
*H04B 17/318* (2015.01)
(Continued)

(52) U.S. Cl.
CPC ...... *H04W 74/0808* (2013.01); *H04B 17/318* (2015.01)

(58) Field of Classification Search
CPC ......... H04W 74/0808; H04W 74/0816; H04W 4/40; H04W 72/02; H04W 4/46;
(Continued)

(56) References Cited

U.S. PATENT DOCUMENTS 11,832,315 B1 * 11/2023 Chu .................. H04W 74/085
2002/0126670 A1 * 9/2002 Yamauchi ........... H04L 12/1836
370/240
(Continued)

FOREIGN PATENT DOCUMENTS

WO  2018-059593 A1  4/2018

OTHER PUBLICATIONS

Insun Jang, 20MHz channel Access in 11bd, IEEE 802.11-19/0366r2 (Mar. 26, 2019).
(Continued)

*Primary Examiner* — Harry H Kim
*Assistant Examiner* — M Mostazir Rahman
(74) *Attorney, Agent, or Firm* — Fox Rothschild LLP

(57) ABSTRACT

A method for operating a first communication node in a wireless communication network may comprise: a step for
(Continued)

measuring the channel busy ratio of a first channel; a step for allowing fallback transmission of a first frame in the first channel on the basis of information about the channel busy ratio of the first channel; a step for performing a channel sensing operation in the first channel and a second channel; and a step for performing fallback transmission of the first frame in the first channel when, as a result of the channel sensing operation, the state of the first channel is an idle state and the state of the second channel is a busy state.

10 Claims, 26 Drawing Sheets

(30) Foreign Application Priority Data

| May 21, 2019 | (KR) | ......................... | 10-2019-0059615 |
| Jul. 29, 2019 | (KR) | ......................... | 10-2019-0091882 |
| Aug. 14, 2019 | (KR) | ......................... | 10-2019-0099804 |
| Aug. 23, 2019 | (KR) | ......................... | 10-2019-0103603 |

(51) Int. Cl.
*H04W 74/0808* (2024.01)
*H04W 84/12* (2009.01)

(58) Field of Classification Search
CPC . H04W 28/02; H04W 84/12; H04W 28/0284; H04W 28/0289; H04W 72/535; H04W 74/085; H04B 17/318
See application file for complete search history.

(56) References Cited

U.S. PATENT DOCUMENTS

| 2018/0049242 | A1 | 2/2018 | Viger et al. |
| 2018/0132278 | A1 | 5/2018 | Oteri et al. |
| 2019/0280919 | A1* | 9/2019 | Sadeghi ................ H04W 72/04 |
| 2020/0178299 | A1* | 6/2020 | Yang ................ H04W 74/0808 |
| 2022/0095282 | A1* | 3/2022 | Jang ...................... H04W 72/04 |
| 2022/0141770 | A1* | 5/2022 | Ahn .................. H04W 52/0216 |
| | | | 370/318 |
| 2022/0191930 | A1* | 6/2022 | Aio ................... H04W 74/0816 |

OTHER PUBLICATIONS

P. Wang et al., "A New MAC Scheme Supporting Voice/Data traffic in Wireless Ad Hoc Networks", In: IEEE Transactions on Mobile Computer, 7:12, pp. 1491-1503 (May 12, 2018).

International Search Report issued Jul. 31, 2020 in corresponding PCT Application No. PCT/KR2020/005815.

* cited by examiner

METHOD AND DEVICE FOR TRANSMITTING FRAME THROUGH DETERMINATION OF CHANNEL EXPANSION IN BROADBAND WIRELESS COMMUNICATION NETWORK

CROSS-REFERENCE TO RELATED APPLICATION

This application is a national phase filed under 35 USC 371 of PCT International Application No. PCT/KR2020/005815 filed on Apr. 29, 2020, which claims under 35 U.S.C. § 119(a) the benefit of Korean Patent Application No. 10-2019-0051002, filed Apr. 30, 2019, Korean Patent Application No. 10-2019-0055739, filed May 13, 2019, Korean Application No. 10-2019-0059615, filed May 21, 2019, Korean Application No. 10-2019-0091882, filed Jul. 29, 2019, Korean Application No. 10-2019-0099804, filed Aug. 14, 2019, and Korean Application No. 10-2019-0103603, filed Aug. 23, 2019, the entire contents of which are incorporated by reference herein.

BACKGROUND

(a) Technical Field

The present disclosure relates to a communication method in a broadband wireless communication network, more particularly, to a method, an apparatus, and a system for frame transmission through an extended channel in a vehicle wireless local access network (LAN).

(b) Description of the Related Art

Recently, with the spread of mobile devices, wireless LAN technology that can provide fast wireless Internet services to the mobile devices has been in the spotlight. The standards for the wireless LAN technology are being developed mainly as the IEEE 802.11 standards by the Institute of Electrical and Electronics Engineers (IEEE). The IEEE 802.11 standards were developed and standardized in such a way that, starting with the initial version supporting 1 to 2 Mbps, they were revised through subsequent versions.

Standardized technologies for specific operations such as fast handoff (i.e., fast BSS transition), fast initial link setup, technology for low-power terminals operating in a band of 1 GHz or below, wireless LAN technology for vehicle terminals, and the like were developed, and reflected in the respective standard revisions. In particular, the wireless LAN technology for vehicle terminals is reflected in the IEEE 802.11p, which is based on a signal form in the IEEE 802.11a and an enhanced distributed channel access (EDCA) in the IEEE 802.11e, and operates in a band of 5.9 GHz. Further, it is based on a 10 MHz bandwidth to be suitable for a terminal having high mobility, and supports 'outside context of BSS (OCB)' communication so that the terminal can directly perform inter-vehicle communications without going through authentication and association procedures with a wireless access point.

Meanwhile, as more sensors and operations are developed for vehicle communication operations, applications for the corresponding operations are diversified, and in order to achieve a higher data throughput and improve a transmission distance compared to the IEEE 802.11p, the IEEE 802.11bd is being developed and standardized to establish a wireless LAN standard for next-generation vehicle communication (i.e., next generation V2X (NGV)).

However, since concept of a wireless access point does not exist in the vehicle communication network such as the IEEE 802.11p and the IEEE 802.11bd, a concept and configuration method for a primary channel may not be clear. Therefore, it is necessary to define a primary channel and a method of configuring the primary channel in the vehicle communication network, and it is necessary to clearly define a channel access method for the defined primary channel.

SUMMARY

The present disclosure is directed to configuring a primary channel and performing channel access by extending a bandwidth of the primary channel in a communication environment, and is directed to providing a method, an apparatus, and a system for a multi-user packet transmission operation using a wireless LAN.

An operation method of a communication node in a wireless communication network, according to an exemplary embodiment of the present disclosure, may include: measuring a channel occupancy ratio of a first channel; allowing fallback transmission of a first frame in the first channel based on the channel occupancy ratio of the first channel; performing a channel sensing operation on the first channel and a second channel; and in response to determining that the first channel is in an idle state, and the second channel is in a busy state as a result of the channel sensing operation, performing fallback transmission of the first frame in the first channel.

The first channel may be a primary channel of 10 MHz bandwidth for transmitting the first frame, the second channel may be a secondary channel of 10 MHz bandwidth for extending the first channel, that is contiguous with the first channel, and the first frame may be a 20 MHz physical layer convergence procedure (PLCP) protocol data unit (PPDU).

In the measuring of the channel occupancy ratio of the first channel, the channel occupancy ratio of the first channel may be measured based on a number of detections of an energy equal to or greater than a threshold during a preset time period as a result of energy detection (ED).

The measuring of the channel occupancy ratio of the first channel may include: receiving a second frame including information on a next transmission time; and calculating the channel occupancy ratio of the first channel based on the information on the next transmission time.

The information on the next transmission time may further include at least one of a period interval of the second frame, a number of repetitions of the second frame, or a service indicator of a payload of the second frame.

In the allowing of the fallback transmission of the first frame, when the channel occupancy ratio of the first channel is lower than a channel occupancy ratio of the second channel, the fallback transmission of the first frame in the first channel may be allowed.

The channel sensing operation may be a first random backoff operation on the first channel and the second channel.

When the first channel is determined to be in the idle state and the second channel is determined to be in the busy state as a result of the first random backoff operation, the channel sensing operation may include further performing a second random backoff operation on the first channel.

An operation method of a communication node in a wireless communication network, according to another exemplary embodiment of the present disclosure, may include: performing a first monitoring operation on a first channel and a second channel; in response to determining that the first channel and the second channel are in idle states during a first period as a result of the first monitoring operation, performing a channel sensing operation on the first channel and the second channel; detecting a busy state of the second channel as a result of the channel sensing operation; allowing fallback transmission of a first frame in the first channel based on a result of detecting the busy state of the second channel; and performing fallback transmission of the first frame in the first channel.

The first channel may be a primary channel of 10 MHz bandwidth for transmitting the first frame, the second channel may be a secondary channel of 10 MHz bandwidth for extending the first channel, that is contiguous with the first channel, and the first frame may be a 20 MHz physical layer convergence procedure (PLCP) protocol data unit (PPDU).

The first period may be an arbitration interframe space (AIFS).

The allowing of the fallback transmission of the first frame may include: detecting a second frame occupying the secondary channel; and measuring a received signal strength indicator (RSSI) of the second frame, wherein when the RSSI of the second frame is equal to or less than a preset range, the fallback transmission of the first frame through the first channel is allowed.

The operation method may further include, when the fallback transmission of the first frame is allowed, performing a second random backoff operation on the first channel.

A communication node in a wireless communication network, according to yet another exemplary embodiment of the present disclosure, may include: a processor; a memory storing at least one instruction executable by the processor; and transmit antennas for transmitting a signal generated by the processor, wherein the at least one instruction is executed to: perform a first monitoring operation on a first channel and a second channel; detect a busy state of the second channel as a result of the channel sensing operation; allow fallback transmission of a first frame in the first channel based on a result of detecting the busy state of the second channel; and perform fallback transmission of the first frame in the first channel.

The first channel may be a primary channel of 10 MHz bandwidth for transmitting the first frame, the second channel may be a secondary channel of 10 MHz bandwidth for extending the first channel, that is contiguous with the first channel, and the first frame may be a 20 MHz physical layer convergence procedure (PLCP) protocol data unit (PPDU).

The at least one instruction may be further executed to, in the detecting of the busy state of the second channel as a result of the channel sensing operation, detect a second frame occupying the second channel.

The second frame may include at least one of a period interval of the second frame, a number of repetitions of the second frame, or a service indicator of a payload of the second frame.

The at least one instruction may be further executed to measure a received signal strength indicator (RSSI) of the second frame; and allow the fallback transmission of the first frame through the first channel when the RSSI of the second frame is equal to or less than a preset range.

The at least one instruction may be further executed to allow the fallback transmission of the first frame through the first channel when a channel occupancy ratio of the first channel is lower than a channel occupancy ratio of the second channel.

The at least one instruction may be further executed to, in the performing of the channel sensing operation, perform a random backoff operation on the first channel and the second channel.

According to the present disclosure, by introducing a method of defining a primary channel in an outside context of BSS (OCB) communication network in which communication is performed without association with a wireless access point (AP), efficient channel access may be performed to transmit a frame.

In the case where a communication node extends the existing bandwidth and transmits a frame through a band having 20 MHz bandwidth, by defining a primary channel based on channel occupancy ratios of channels, fairness with legacy terminals can be satisfied according to a purpose of frame transmission, and channel access can be performed by using the channels efficiently.

The present disclosure may be applied to various communication devices such as a communication node, wireless access point, access management apparatus, station and base station using cellular communications, and the like.

DETAILED DESCRIPTION

Figure 1:
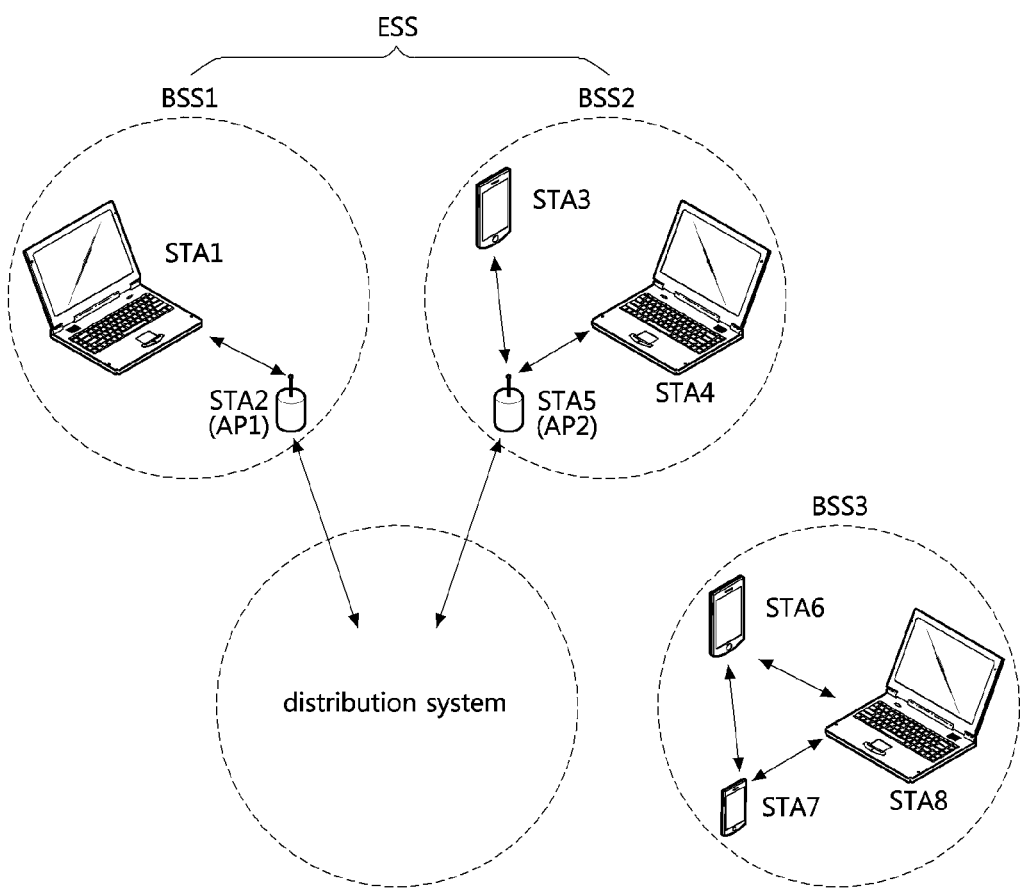
FIG. 1 is a diagram illustrating a first exemplary embodiment of a WLAN system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

FIG. 1 is a diagram illustrating a first exemplary embodiment of a wireless LAN system.

As shown in FIG. 1, a wireless LAN system may include at least one basic service set (BSS). The BSS denotes a set of stations (STAs) (e.g., STA1, STA2 (i.e., AP1), STA3, STA4, and STA5 (i.e., AP2), STA6, STA7, and STA8) configured to communicate with each other through successful synchronization. The BSS does not necessarily denote a specific area. In exemplary embodiments below, a station that performs a function of an access point may be referred to as an "access point (AP)", and a station that does not perform the function of an access point may be referred to as a "non-AP station" or "station".

The BSSs may be classified as infrastructure BSSs and independent BSSs (IBSSs). In particular, a BSS1 and a BSS2 may be infrastructure BSSs, and a BSS3 may be an IBSS. The BSS1 may include a first station STA1, a first access point STA2 (AP1) providing a distribution service, and a distribution system (DS) connecting a plurality of access points (i.e., STA2 (AP1), STA5 (AP2)). In the BSS1, the first AP (STA2 (AP1)) may manage the first station STA1.

The BSS2 may include a third station STA3, a fourth station (STA4), a second access point (STA5 (AP2)) providing a distribution service, and a distribution system (DS) connecting a plurality of access points (i.e., STA2 (API), STA5 (AP2)). In the BSS2, the second AP (STA5 (AP2)) may manage the third station STA3 and the fourth station STA4.

The BSS3 may be an IBSS operating in an ad-hoc mode. In the BSS3, there is not an AP that is a centralized management entity performing management functions at a center. In other words, in the BSS3, the stations STA6, STA7, and STA8 may be managed in a distributed manner. In the BSS3, all the stations STA6, STA7, and STA8 may be mobile stations and may be not permitted to connect to the DS, thus forming a self-contained network.

The access points (STA2 (AP1), STA5 (AP2)) may provide access to the DS via a wireless medium for the stations STA1, STA3, and STA4 associated therewith. In the BSS1 or BSS2, communication between the stations STA1, STA3, and STA4 may be generally performed through the access points (STA2 (AP1), STA5 (AP2)), but when direct links are established, direct communication between the stations STA1, STA3, and STA4 may be possible.

A plurality of infrastructure BSSs may be interconnected via a DS. A plurality of BSSs connected via a DS is referred to as an extended service set (ESS). The stations (e.g., STA1, STA2 (i.e., AP1), STA3, STA4, and STA5 (i.e., AP2)) included in an ESS may be configured to communicate with each other, and a station (e.g., STA1, STA3, or STA4) in the ESS may move from one BSS to another BSS while performing seamless communication.

The DS is a mechanism for one access point to communicate with another access point. Using the DS, the access point may transmit frames for stations associated with a BSS it manages, or may transmit frames to stations having moved to another BSS. In addition, the access point may transmit and receive frames to and from an external network such as a wired network. Such the DS may not necessarily have to be a network, and if it can provide a predetermined distribution service specified in the IEEE 802.11 standard, there is no restriction on its form. For example, the DS may be a wireless network such as a mesh network or a physical structure that connects access points to each other.

Stations (i.e., communication nodes) of a wireless LAN vehicle-to-everything (V2X) network may not perform operations of configuring a BSS by synchronizing with an access point. The stations (i.e., communication nodes) of the wireless LAN vehicle communication network may perform 'Outside the Context of BSS (OCB)' communication for direct communication between the station(s). Each of the stations performing OCB communication may transmit a frame to other station(s) while omitting a procedure for synchronization with the access point.

Each of the communication nodes (e.g., STA1, STA2 (AP1), STA3, STA4, STA5 (AP2), STA6, STAT, and STAB) included in the wireless LAN system may be configured as follows.

Figure 2:
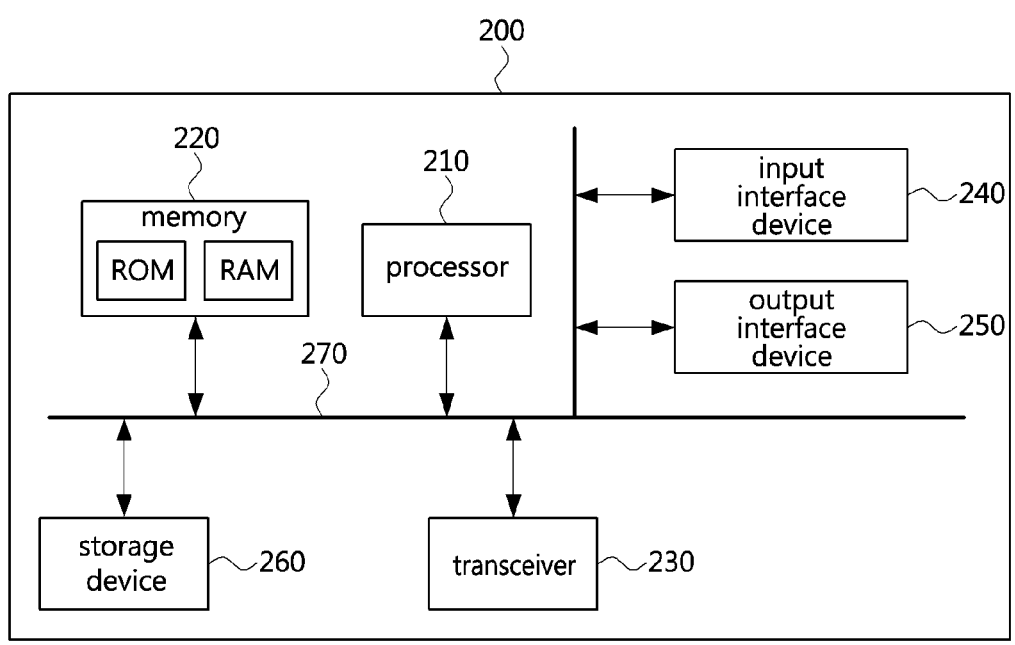
FIG. 2 is a block diagram illustrating an exemplary embodiment of a communication node constituting a WLAN system.

FIG. 2 is a block diagram illustrating an exemplary embodiment of a communication node configured as a WLAN system.

As shown in FIG. 2, a communication node 200 may include at least one processor 210, a memory 220, and a transceiver 230 connected to a network for performing communications. The transceiver 230 may also be referred to as a "radio frequency (RF) unit", "RF module", or the like. Additionally, the communication node 200 may further include an input interface device 240, an output interface device 250, a storage device 260, and the like. Each component included in the communication node 200 may be configured to communicate with each other as connected via a common bus 270.

However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, and the storage device 260 via a dedicated interface.

The processor 210 may be configured to execute at least one instruction stored in at least one of the memory 220 and the storage device 260. The processor 210 may refer to a central processing unit (CPU), a graphics processing unit (GPU), or a dedicated processor. Methods in accordance with exemplary embodiments of the present disclosure may be performed by the processor 210. Each of the memory 220 and the storage device 260 may include at least one of a volatile storage medium and a non-volatile storage medium. For example, the memory 220 may include at least one of read-only memory (ROM) and random access memory (RAM).

Meanwhile, in the WLAN system, an association procedure may be performed as follows.

Figure 3:
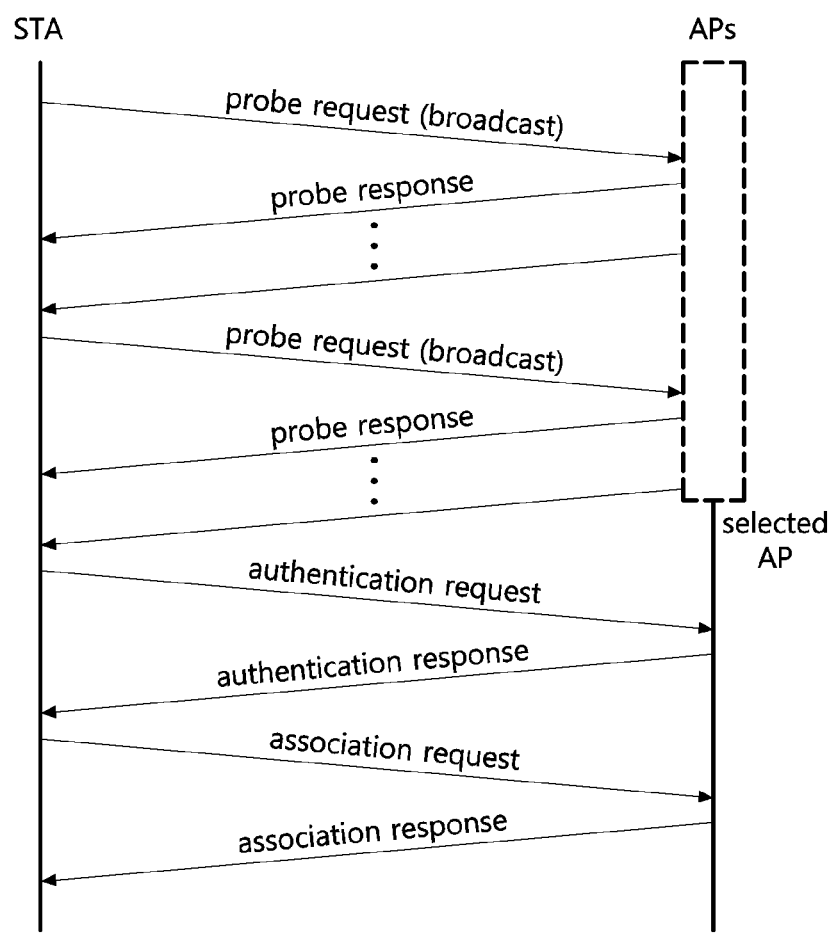
FIG. 3 is a sequence chart illustrating an association procedure of a station in a WLAN system according to an exemplary embodiment.

FIG. 3 is a sequence chart illustrating an association procedure of a station in a WLAN system.

As shown in FIG. 3, an association procedure of a station STA in an infrastructure BSS may generally be divided into a probe step of probing an AP, an authentication step for authentication with the probed AP, and an association step of associating with the authenticated AP.

The STA may first detect neighboring APs using a passive scanning scheme or an active scanning scheme. When the passive scanning scheme is used, the STA may detect neighboring APs by overhearing beacons transmitted by the APs. When the active scanning scheme is used, the STA may transmit a probe request frame, and may detect neighboring APs by receiving probe response frames that are responses to the probe request frame from the APs.

When the neighboring APs are detected, the STA may perform an authentication step with the detected APs. In this case, the STA may perform the authentication step with a plurality of APs. An authentication algorithm according to the IEEE 802.11 standard may be classified into an open system algorithm of exchanging two authentication frames, a shared key algorithm of exchanging four authentication frames, and the like.

The STA may transmit an authentication request frame based on the authentication algorithm according to the IEEE 802.11 standard, and may complete authentication with the AP by receiving an authentication response frame that is a response to the authentication request frame from the AP.

When the authentication with the AP is completed, the STA may perform an association step with the AP. In this case, the STA may select one AP from among the APs that have performed the authentication step with itself, and may perform the association step with the selected AP. That is, the STA may transmit an association request frame to the selected AP, and may complete the association with the AP by receiving an association response frame that is a response to the association request frame from the selected AP.

In the case of wireless LAN V2X communication, the stations (i.e., communication nodes) may not need to perform operations of configuring a BSS by synchronizing with an AP, and may perform OCB communication for direct communication between the station(s). Each of the stations performing OCB communication may transmit a frame to other station(s) while omitting a beacon reception procedure for discovering an AP and synchronizing with the AP, probe request/response procedure, association request/response procedure, authentication procedure, and the like.

Meanwhile, a communication node (e.g., access point, station, etc.) belonging to the WLAN system may be configured to perform transmission and reception of a frame based on a point coordination function (PCF), a hybrid coordination function (HCF), an HCF controlled channel access (HCCA), a distributed coordination function (DCF), and/or an enhanced distributed channel access (EDCA).

The frame in the WLAN system may be classified into a management frame, a control frame, and a data frame. The management frame may be classified into an association request frame, an association response frame, a reassociation request frame, a reassociation response frame, a probe request frame, a probe response frame, a beacon frame, and an association. Additionally, the management frame may include a disassociation frame, an authentication frame, a deauthentication frame, an action frame, and the like.

The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frame. The QoS data frame may refer to a data frame for transmission based on the QoS, and the non-QoS data frame may refer to a data frame for transmission not based on the QoS.

Meanwhile, in the WLAN system, a communication node (e.g., access point or station) may be configured to operate based on the EDCA.

Figure 4:
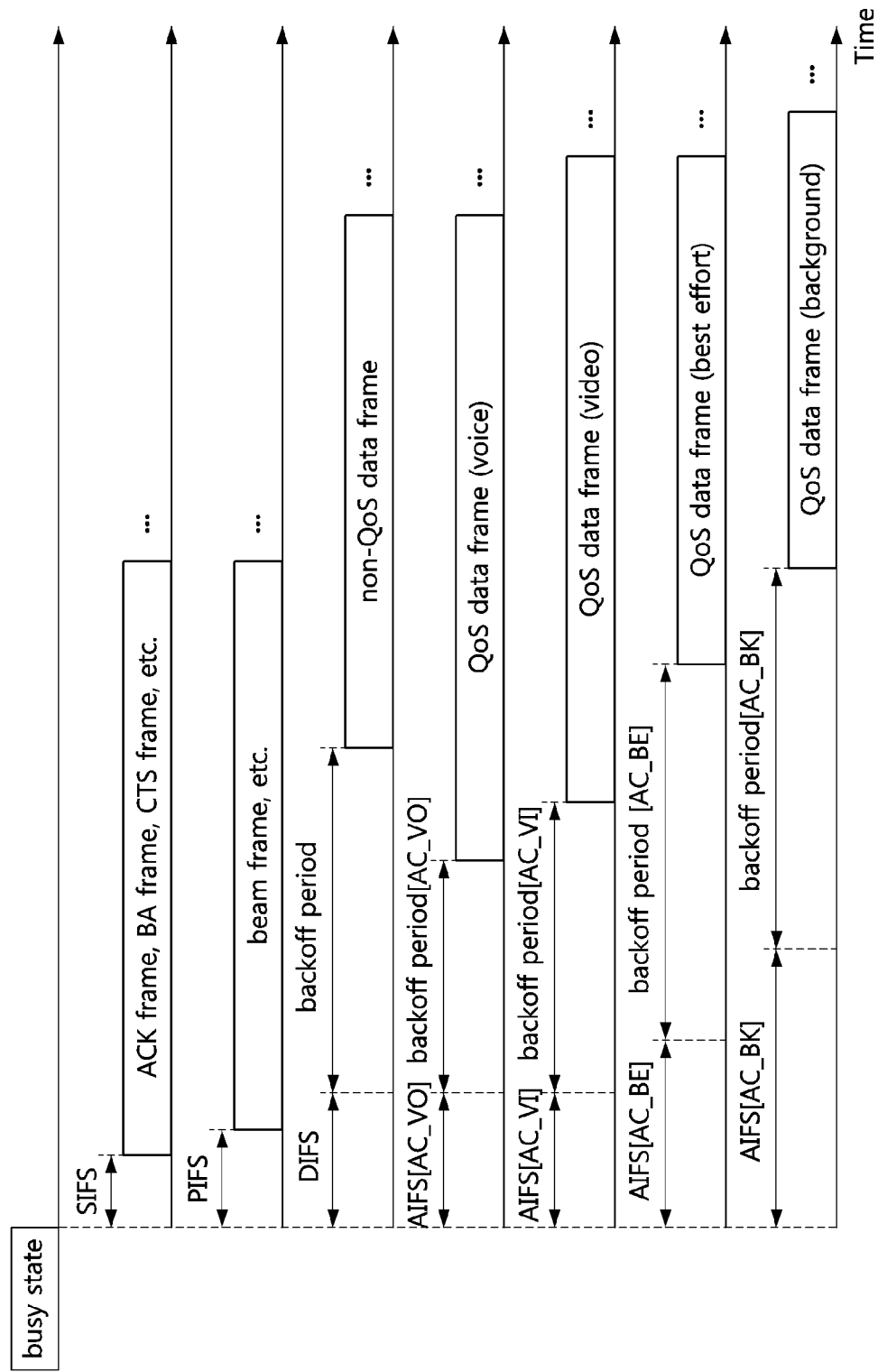
FIG. 4 is a timing diagram illustrating a first exemplary embodiment of an operation method of a communication node based on an EDCA.

FIG. 4 is a timing diagram illustrating a first exemplary embodiment of an operation method of a communication node based on an EDCA.

As shown in FIG. 4, a communication node intending to transmit a control frame (or management frame) may be configured to perform a monitoring operation (e.g., carrier sensing operation) on a channel state during a predetermined period (e.g., short interframe space (SIFS) or PCF IFS (PIFS)). When the channel state is determined to be idle during the predetermined period (e.g., SIFS or PIFS), the communication node may be configured to transmit a control frame (or management frame). For example, the communication node may be configured to transmit an ACK frame, a BA frame, a CTS frame, or the like when the channel state is determined to be idle during an SIFS. Additionally, the communication node may be configured to transmit a beacon frame or the like when the channel state is determined to be idle during a PIFS. When the channel state is determined to be busy during the predetermined period (e.g., SIFS or PIFS), the communication node may be configured not to transmit a control frame (or management frame). In particular, the carrier sensing operation may be referred to as a clear channel assessment (CCA) operation.

A communication node intending to transmit a non-QoS data frame may be configured to perform a monitoring operation (e.g., carrier sensing operation) on a channel state during a DCF IFS (DIFS). When the channel state is determined to be idle during a DIFS, the communication node may be configured to perform a random backoff procedure. For example, the communication node may be configured to select a backoff value (e.g., backoff counter) within a contention window based on the random backoff procedure, and perform the monitoring operation (e.g., carrier sensing operation) during a period corresponding to the selected backoff value. The communication node may be configured to transmit a non-QoS data frame when the channel state is determined to be idle during the backoff period.

A communication node intending to transmit a QoS data frame may be configured to perform a monitoring operation (e.g., carrier sensing operation) on a channel state during an arbitration IFS (AIFS). When the channel state is determined to be idle during an AIFS, the communication node may be configured to perform a random backoff procedure. The AIFS may be set based on an access category (AC) of a data unit (e.g., protocol data unit (PDU)) included in the QoS data frame. The AC of the data unit may be as shown in Table 1 below.

TABLE 1

| Priority | AC | Description |
|---|---|---|
| Lowest | AC_BK | Background |
| . | AC_BE | Best effort |
| . | AC_VI | Video |
| Highest | AC_VO | Voice |

AC_BK may indicate background data, AC_BE may indicate data transmitted in a best effort manner, AC_VI may indicate video data, and AC_VO may indicate voice data. For example, the length of the AIFS for the QoS data frame of each of AC_VO and AC_VI may be set equal to the length of the DIFS. The length of the AIFS for the QoS data frame of AC_BE and AC_BK may be set longer than the length of the DIFS. The length of the AIFS for the QoS data frame of AC_BK may be set longer than the length of the AIFS for the QoS data frame of AC_BE.

In the random backoff procedure, the communication node may be configured to select a backoff value (e.g., backoff counter) within a contention window based on the AC of the QoS data frame. The contention window based on the AC may be as shown in Table 2 below. As shown below, $CW_{min}$ may indicate the minimum value of the contention window, $CW_{max}$ may indicate the maximum value of the contention window, and each of the minimum and maximum values of the contention window may be expressed by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may be configured to perform a monitoring operation (e.g., carrier sensing operation) on the channel state during a backoff period, and transmit the QoS data frame when the channel state is determined to be idle during the backoff period.

Hereinafter, wireless LAN multi-channel operation methods in a communication system will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a non-AP station is described, the corresponding AP may be configured to perform an operation that corresponds to the operation of the non-AP station. Conversely, when an operation of the AP is described, the corresponding non-AP station may be configured to perform an operation that corresponds to the operation of the AP.

Figure 5:
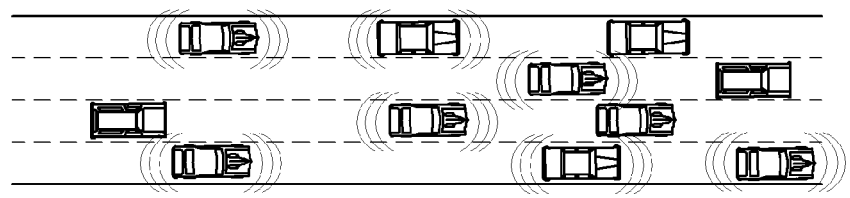
FIG. 5 is a conceptual diagram illustrating an exemplary embodiment of a communication network including communication nodes performing vehicle-to-vehicle communication.

FIG. 5 is a conceptual diagram illustrating an exemplary embodiment of a communication network including communication nodes performing vehicle-to-vehicle communication.

As shown in FIG. 5, when a vehicle communication node including a communication device detects a specific situation through a sensor or performs a specific operation, the vehicle communication node may transmit and receive data including a position, speed, acceleration, and measurement result of the sensor of a vehicle in form of a broadcast frame. In addition, the vehicle communication node may receive a map of the surrounding situation and information on a specific event (e.g., accident and congestion information in the direction of road travel, etc.) from a roadside device such as a street light, traffic light, or the like on the road. The communication node in the vehicle communication network environment may not perform scanning, authentication, and association operations performed in the conventional WLAN operation, and may transmit and receive OCB data without belonging to a specific BSS. Accordingly, a periodic beacon frame transmission operation or the like from a wireless access point may not be performed.

Figure 6:
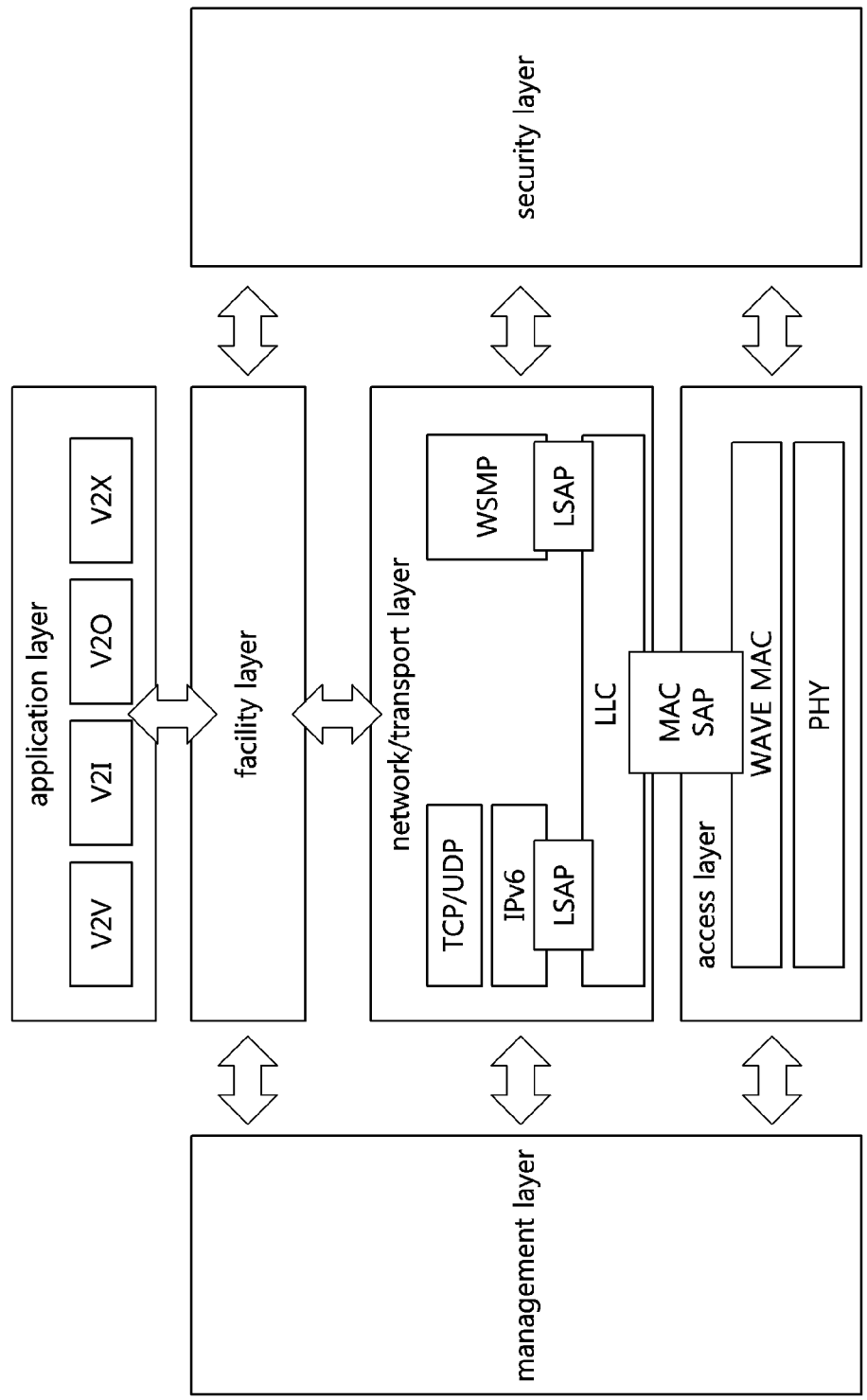
FIG. 6 is a conceptual diagram illustrating an exemplary embodiment of a layer structure of a communication node performing vehicle-to-vehicle communication.

FIG. 6 is a conceptual diagram illustrating an exemplary embodiment of a layer structure of a communication node performing vehicle-to-vehicle communication.

As shown in FIG. 6, a communication node performing vehicle-to-vehicle communication may include an application layer, which is an uppermost layer, a UDP/TCP performing an operation of a transport layer for ensuring reliability of end-to-end data transmission, an IPv6 performing an operation of a network layer for finding a transmission path between multiple nodes, a logical link control (LLC) sublayer and a medium access control (MAC) layer belonging to a data link layer for point-to-point transmission, and a physical (PHY) layer transmitting an actual signal.

The application layer may implement and support various use cases or applications. For example, the application layer may provide various applications in a communication system, including vehicle-to-vehicle (V2V) applications, vehicle-to-infrastructure (V2I) applications, and vehicle-to others (V2O) applications.

A facility layer may be a layer for effectively implementing various use cases defined by the application layer. For example, the facility layer may be a layer that generates a message (or message set) based on information to be transmitted by the application layer, which is an upper layer.

The network/transport layer may be a layer constituting the network for V2X communication by supporting various network protocols and transport protocols. The network for V2X communication may include a homogenous network and/or a heterogenous network. For example, the network and transport layers may provide Internet connectivity and routing to communication nodes via Internet protocols such as TCP/UDP+IPv6.

Alternatively, in the case of V2V communication, since a transmitting terminal may directly transmit data to a receiving terminal, an operation of transmitting data to the receiving terminal through another terminal may be unnecessary. Thus, the communication node may not require the existing network/transport layers and data link layer. Accordingly, in order to simplify the functions of the network/transport layer, some functions of the network/transport layer and the data link layer may be replaced with a wireless access in vehicular environments (WAVE) short message protocol (WSMP).

An access layer may be a layer that transmits messages/data received from upper layers through physical channels. For example, the access layer may support the IEEE 802.11 and/or 802.11p standard-based communication technology, the IEEE 1609 and/or IEEE 1609.4 standard-based communication technology, and the like to transmit messages and/or data through physical channels. The access layer may include the MAC layer and the PHY layer. The MAC layer of the communication node constituting the V2X communication system may refer to a WSMP MAC layer. Each of the layers may deliver data and/or signals to a lower layer as described below.

Each of the layers constituting the communication node may transmit data and additional information through a service access point (SAP). For example, the LLC layer may obtain data and parameters such as a source address and a destination address from the WSMP or IPv6 through a link service access point (LSAP). In particular, the LLC layer may obtain channel load information measured by the communication node from the WSMP through the LSAP. Alternatively, the LLC layer may deliver channel load information measured by the communication node to the WSMP. The channel load information may indicate a channel occupancy ratio (%) for a predetermined time and the number of communication nodes having performed transmission for a predetermined time. The LSAP used in WAVE may be the same as SAP parameters used in the conventional WLAN except for DL-UNITDATA.request, which is a parameter received from an upper layer, and DL-UNITDATA.request may further include parameters for WAVE-related operations, and may be delivered in form of UNITDATAX.request. DL-UNITDATAX.request may include one or more of the following elements. Each parameter included in DL-UNITDATAX.request may be as defined in Table 3.

[Equation 3]

| Parameter | Description |
| --- | --- |
| source_address | Source address |
| destination-address | Destination address |
| data | Same as in the existing wireless LAN |
| priority | Priority between communication nodes |
| Channel identifier | indicates a channel for transmitting a WSM |
| Time slot | indicates a time slot in which a corresponding message is to be transmitted (i.e., time slot 0 or 1) in association with channel switching of WAVE |
| Data rate | indicates a data rate used for transmitting a WSM |
| TxPwr_Level | indicates a transmit power used for transmitting a WSM |

-continued

[Equation 3]

| Parameter | Description |
| --- | --- |
| Channel Load | indicates a channel load measured (or recognized) by the communication node - channel occupancy ratio (%) for a predetermined time, or the number of communication nodes having performed transmission for a predetermined time |
| WsmExpiryTime | optionally included when transmitted through a WSMP. A frame is not transmitted when the corresponding time expires. |
| Transmit Bandwidth | Bandwidth (10 MHz or 20 MHz) of a channel in which a WSM is transmitted |
| Primary channel | indicates a primary channel when Transmit Bandwidth = 20 MHz |
| Fallback allowed | indicates whether fallback transmission through a 10 MHz channel when Transmit Bandwidth = 20 MHz (optional field) |

According to Table 3, among the parameters received through the LSAP, the channel load may indicate a congestion level of a channel, and it may be transmitted to another terminal as being included in a WSMP message, or may be delivered to the MAC layer through a MAC SAP, thereby being utilized to perform an operation according to a channel state. Alternatively, the channel load may indicate the congestion level of the channel, and may refer to a channel occupancy ratio (%) measured by the communication node for a predetermined time and the number of terminals having performed transmission for a predetermined time. It may also be used when the communication node informs to an upper layer. The channel load may be measured periodically and delivered to the upper layer. The channel load information may be information obtained as a channel load parameter of a DL-UNITDATAX.request primitive through the LSAP, and may be delivered to the MAC layer in form of adding a channel load parameter to MA-UNITDATA.request of the MAC SAP of the existing wireless LAN.

The transmission bandwidth may indicate transmission of a frame on a channel having a 20 MHz bandwidth when the amount of data to be transmitted exceeds a preset range. When the transmission bandwidth indicates frame transmission on a channel having a 20 MHz bandwidth, the channel having a 20 MHz bandwidth may be specified in the channel information, and the primary channel parameter may indicate a primary channel for performing channel access. Additionally, when an upper layer indicates transmission of a 20 MHz bandwidth, DL-UNITDATAX.request may selectively include whether transmission on a 10 MHz channel is possible according to the channel occupancy ratio. The delivered channel load information, transmission bandwidth, primary channel, and parameter on whether 10 MHz transmission is allowed may be delivered to the MAC layer in form of adding the corresponding parameters to MA-UNITDATA.request of the MAC SAP of the existing wireless LAN or MA-UNITDATAX.request of the WSMP.

In addition, the MAC layer may receive from the PHY layer whether a specific channel is busy or the like through a PHY SAP. For example, when performing channel sensing in an energy detection (ED) scheme while performing channel access, the MAC layer may receive information on whether a channel is busy and information on a channel that is busy through PHY-CCA.indication from the PHY layer. In this case, by including an IPI-REPORT parameter in CCA.indication or adding a parameter corresponding to a degree (low, medium, high) of a received signal strength, information on a strength of a signal received when a channel busy state is recognized through the CCA may be received from the PHY layer.

The management layer may be a layer managing operations of the layers included in the communication node. The management layer may provide services and information for management and operation of the facility layer through an interface between a management entity and the facility layer (MF) (or MF-SAP). In addition, the management layer may provide services and information for management and operation of the network/transport layer and the access layer through interfaces with the network/transport layer and the access layer.

A security layer may be a layer managing security-related information of the layers included in the communication node. The security layer may provide services and information for security of the facility layer through an interface between a security entity and the facility layer (SF) (or SF-SAP). In addition, the security layer may provide services and information for security of the network/transport layer and the access layer through interfaces with the network/transport layer and the access layer.

Figure 7:
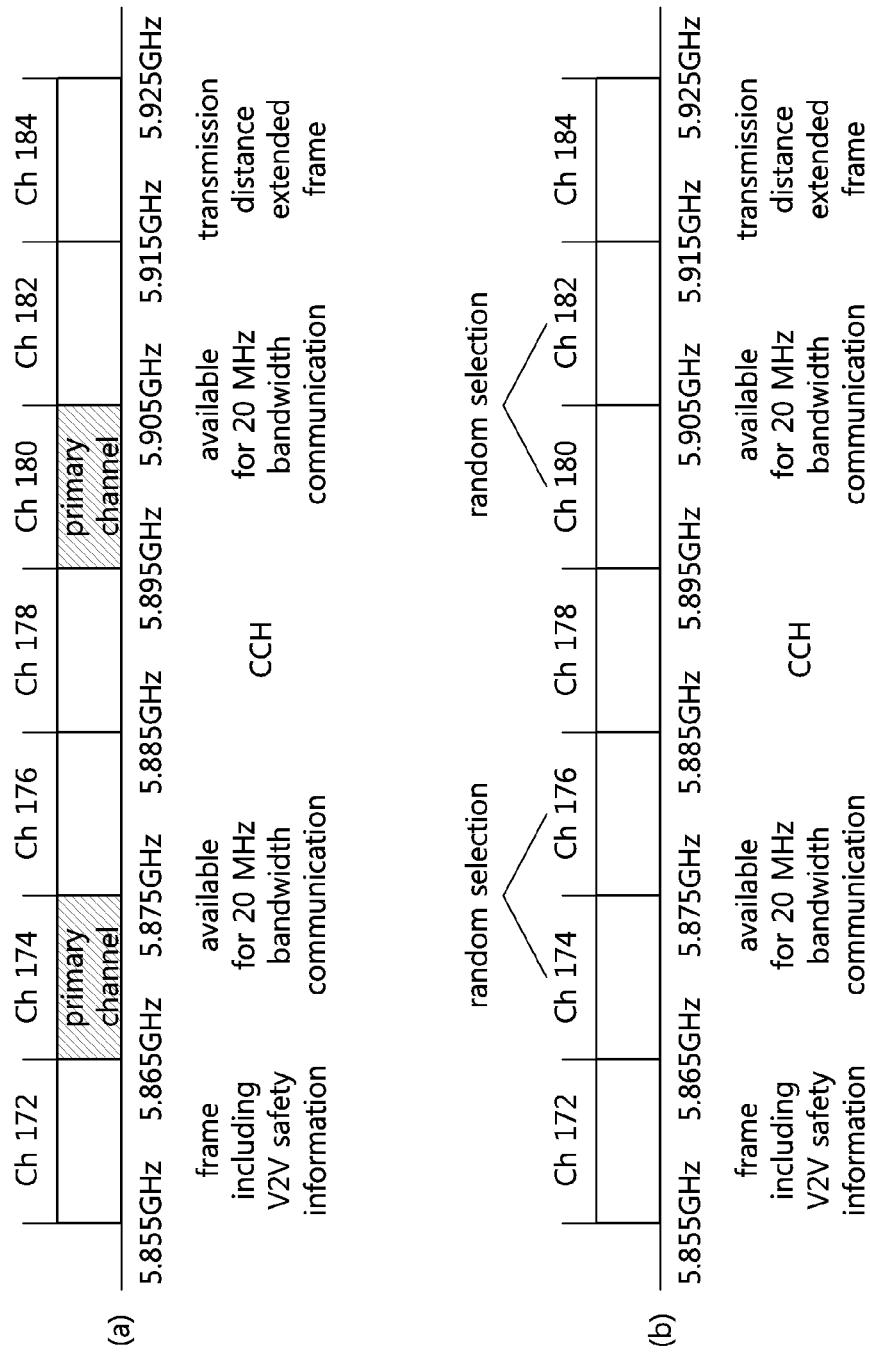
FIG. 7 is a conceptual diagram illustrating a first exemplary embodiment of a method for allocating a channel and defining a primary channel for a communication node performing vehicle-to-vehicle communication.

FIG. 7 is a conceptual diagram illustrating a first exemplary embodiment of a method for allocating a channel and defining a primary channel for a communication node performing vehicle-to-vehicle communication.

As shown in (a) of FIG. 7, in case of the United States, a channel of a 5.9 GHz band for vehicle communication is defined as a band of 5.850 GHz to 5.925 GHz band, of which a channel 178 (5.885 GHz to 5.895 GHz) may be used for a control channel for transmitting control information or broadcasting use of another channel. Among the channels, a channel 172 may be a channel only for transmission of a safety message between vehicle communication nodes, and a channel 184 may be a channel allocated to extend a transmission distance of a frame. Accordingly, channels that can be used for 20 MHz bandwidth transmission may belong to a band of 5.865 GHz to 5.885 GHz or a band of 5.895 GHz to 5.915 GHz.

In order to transmit data at a high data rate using a 20 MHz bandwidth, as utilized in the existing WLAN standard (IEEE 802.11n or IEEE 802.11ac), the communication node may transmit a frame by extending a bandwidth based on a primary channel. When the communication node extends a bandwidth based on the primary channel, the communication node may preconfigure the primary channel.

According to an exemplary embodiment, a communication node may fixedly configure a part of a band used for 20 MHz bandwidth communication as a primary channel. For example, if the communication node uses a band of 5.865 GHz to 5.885 GHz to transmit a signal having 20 MHz bandwidth, the communication node may fix a channel 174 (i.e., 5.865 GHz-5.875 GHz) as the primary channel to perform control channel access and frame transmission operations. When all vehicle communication nodes use the same primary channel, the communication node may basically recognize one channel (e.g., channel 174) among radio resources of 20 MHz bandwidth as the primary channel, and may sense the primary channel. In addition, the communication node performing the channel access operation may decode a frame by detecting the frame received through the 20 MHz channel as a result of sensing the primary channel or by detecting the frame received through the primary channel.

When intending to transmit a 20 MHz bandwidth signal by changing the primary channel of the corresponding band, the communication node may broadcast information on whether the primary channel is changed to the other communication nodes by a method utilizing a protocol in the upper layer (e.g., the method of indicating a primary channel together when a CCH indicates a channel to be used in a next period as in the existing IEEE 1609.4).

As shown in (b) of FIG. 7, in order to minimize the disadvantage that a communication node of one channel continuously suffers losses due to the fixed primary channel configuration as in (a) of FIG. 7, the communication node may not fixedly designate one primary channel, and may configure the primary channel randomly. The communication node may randomly configure one primary channel whenever channel access is performed by extending a bandwidth to 20 MHz, and may transmit a frame through the configured primary channel. Alternatively, the communication node may change configuration of the primary channel whenever performing channel access for transmitting a 20 MHz bandwidth signal. For example, when transmitting a frame through channels 174 and 176, the communication node may configure the channel 174 as the primary channel when transmitting the first frame, and may configure the channel 176 as the primary channel when transmitting the next frame. Even when the communication node transmits frames through the channels 180 and 182, the communication node may change the channel configuration by applying the same scheme. When communication nodes configure the primary channels randomly or alternately, the communication node receiving the frame from other communication nodes cannot identify the primary channel among the two channels in advance, so that the communication node may sense each 10 MHz channel constituting the 20 MHz bandwidth channel.

Figure 8:
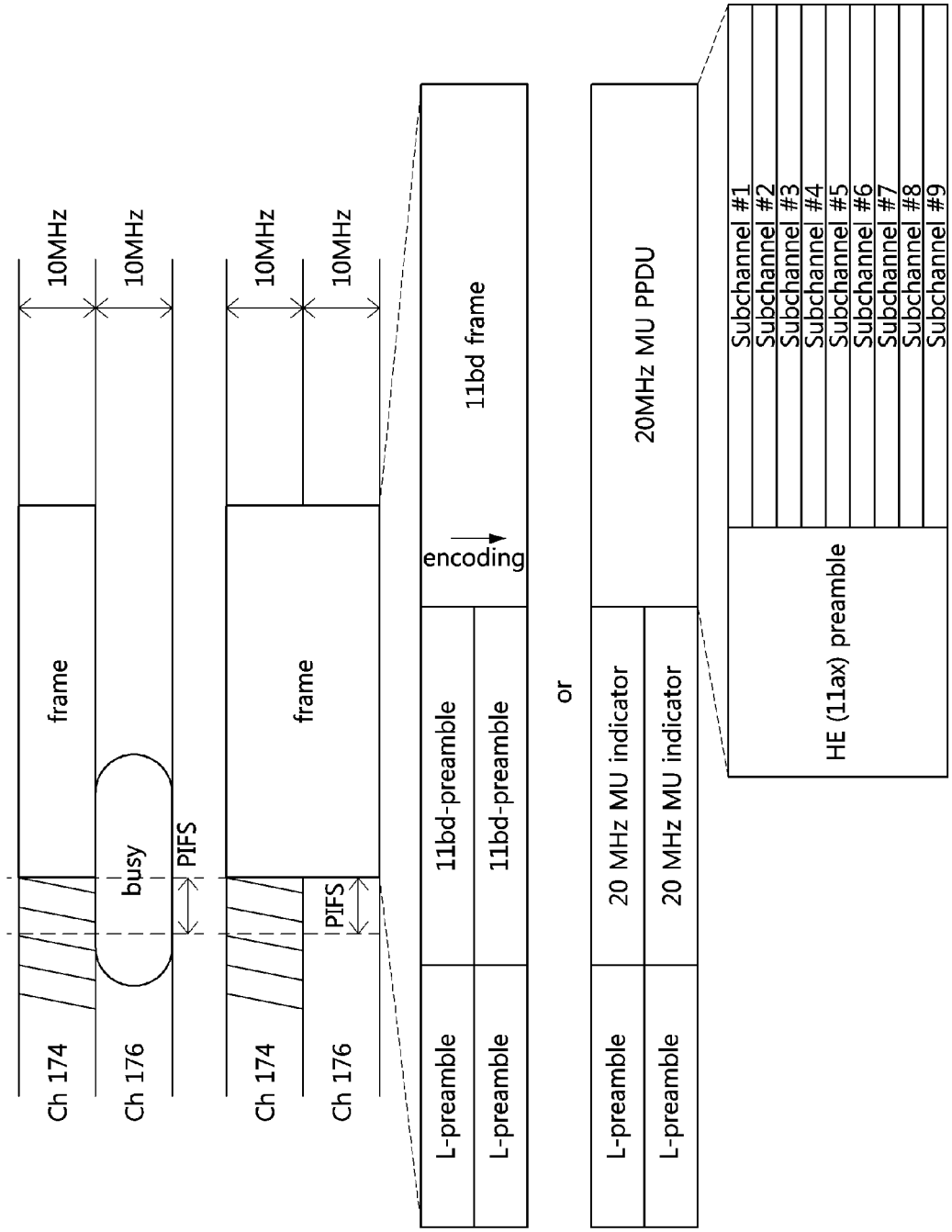
FIG. 8 is a conceptual diagram illustrating an exemplary embodiment of frame transmission through a 20 MHz channel extended based on a primary channel.

FIG. 8 is a conceptual diagram illustrating an exemplary embodiment of frame transmission through a 20 MHz channel extended based on a primary channel.

As shown in FIG. 8, a communication node may transmit a frame through a radio resource having a bandwidth extended to 20 MHz. The radio resource having a bandwidth extended to 20 MHz may include two channels (e.g., channel 174 or channel 176), and the two channels for frame transmission may include a primary channel and a secondary channel arranged adjacent to the primary channel. For example, the primary channel of the communication node may be the channel 174 among the two channels for frame transmission, and the secondary channel may be the channel 176 among the two channels. In order to transmit a frame through the radio resource having 20 MHz bandwidth, the communication node may perform a channel access procedure on the primary channel.

The communication node may perform a random backoff operation for the channel access on the primary channel, and may perform a channel monitoring operation on the secondary channel during a preset time period. The length of the preset time period may be a PIFS, and an ending time of the PIFS may be the same as a completion time of the random backoff operation on the primary channel. As a result of the channel monitoring on the secondary channel, if the secondary channel is determined to be busy during a PIFS time period, the communication node may not transmit a frame through the secondary channel, and may transmit the frame only through the primary channel. The communication node may transmit the frame to be transmitted on a 20 MHz bandwidth channel through the primary channel, which is a 10 MHz bandwidth channel, and the frame transmission operation through the 10 MHz bandwidth channel may be referred to as a fallback transmission.

On the other hand, as the result of the channel monitoring on the secondary channel, if the secondary channel is determined to be idle during the PIFS time period, the communication node may transmit the frame through the primary channel and the secondary channel. The frame transmitted through the 20 MHz bandwidth channel including the primary channel and the secondary channel may be a frame according to the IEEE 802.11bd protocol. The frame according to the IEEE 802.11bd protocol may include L-preambles, 11bd-preambles, and data. Alternatively, the frame transmitted through the 20 MHz bandwidth channel including the primary channel and the secondary channel may be a frame including a 20 MHz multi user (MU) PPDU. The frame including the 20 MHz MU PPDU may further include L-preambles, and indicators indicating support of communication with multiple users through the 20 MHz channel. The communication node may transmit the frame including the 20 MHz MU PPDU to a plurality of communication nodes through the primary channel and the secondary channel. A structure of the frame transmitted through the 20 MHz bandwidth channel including the primary channel and the secondary channel may be as described below.

Figure 9:
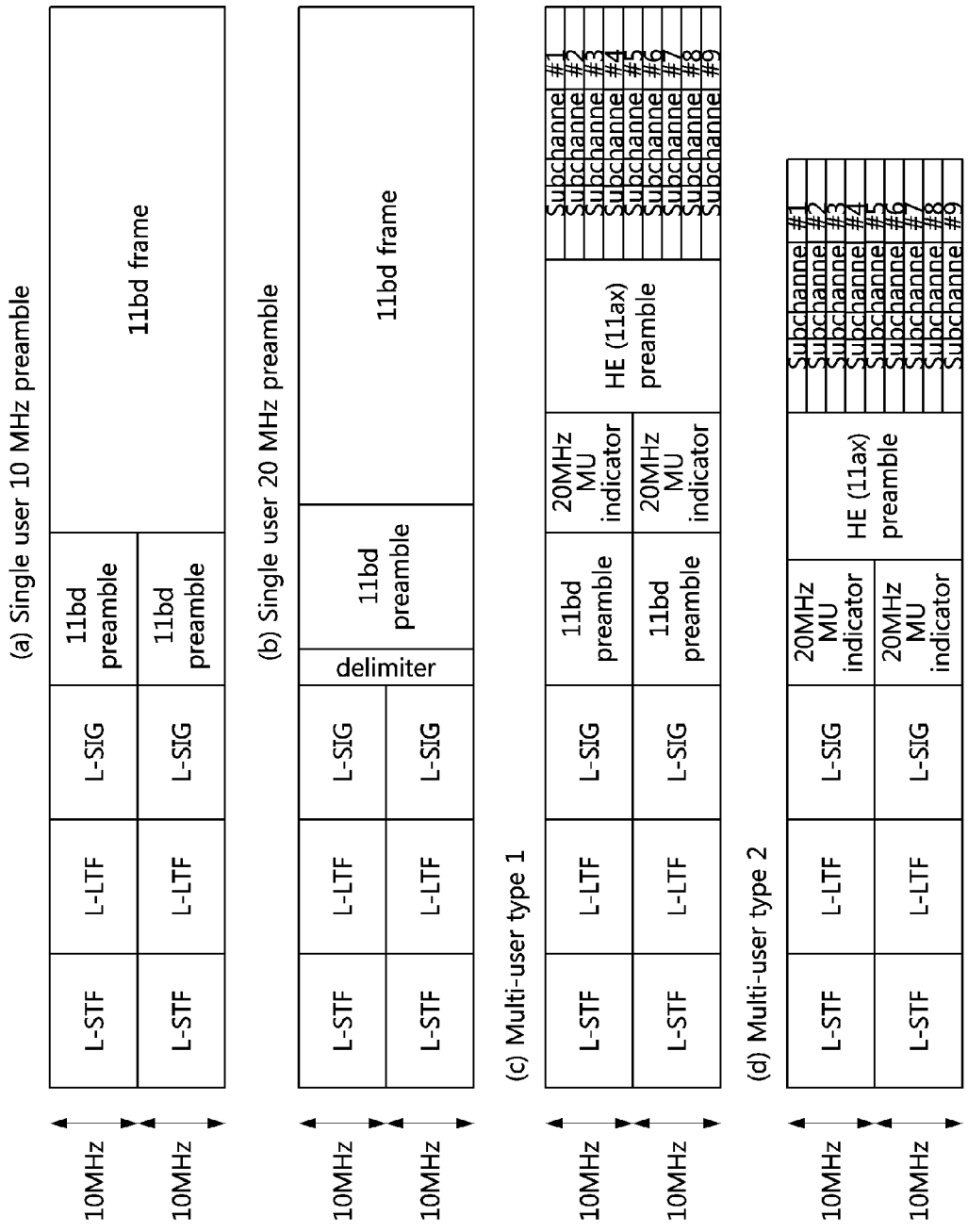
FIG. 9 is a conceptual diagram illustrating an exemplary embodiment of a structure of a frame transmitted through a 20 MHz channel extended based on a primary channel.

FIG. 9 is a conceptual diagram illustrating an exemplary embodiment of a structure of a frame transmitted through a 20 MHz channel extended based on a primary channel.

As shown in FIG. 9, a communication node may basically transmit a frame through a channel having 10 MHz bandwidth (i.e., 10 MHz channel), and may transmit a frame through a channel having 20 MHz bandwidth (i.e., 20 MHz channel) by additionally using a secondary channel based on a result of channel monitoring on the secondary channel. A structure of the frame transmitted through the 20 MHz channel including the primary channel and the secondary channel may be one of structures of (a) to (d) of FIG. 9.

The structure according to (a) of FIG. 9 may be a structure of a frame transmitted to a single user. The frame may include a preamble part and a data part, and the preamble part may further include L-STF, L-LTF, L-SIG and 11bd preamble. The communication node may transmit the same preamble part as a preamble part of a frame having 10 MHz bandwidth through the secondary channel. In addition, the communication node may transmit data through the channel having 20 MHz bandwidth.

The structure according to (b) of FIG. 9 may be a structure of a frame transmitted to a single user. At least part of a preamble part of (b) of FIG. 9 may be transmitted through a 20 MHz channel. The communication node may transmit L-STF, L-LTF, and L-SIG among preambles through the primary channel, and may transmit the duplicated L-STF, L-LTF, and L-SIG through the secondary channel. In addition, the communication node may transmit the IEEE 802.11bd preamble through the 20 MHz channel. In order to distinguish the part of the preambles transmitted through the 10 MHz channel and the part of the preambles transmitted through the 20 MHz channel, the communication node may further transmit a delimiter indicating that the bandwidth of the channel for transmitting the preambles is changed.

The communication node may receive the L-STF, L-LTF, and L-SIG among the preambles of the frame through the 10 MHz primary channel from another communication node, and may further receive the delimiter through the 10 MHz primary channel. The delimiter may include pattern information according to a preconfigured OFDM modulation symbol. In addition, the communication node that transmits and receives the delimiter may obtain information on a channel extension direction for the channel extended as the 20 MHz channel based on information of the OFDM modulation symbol, and the like. For example, based on a combination of patterns included in the delimiter, the frame may indicate whether the channel is extended from the upper 10 MHz channel to the lower 10 MHz channel or extended from the lower 10 MHz channel to the upper 10 MHz channel.

(c) and (d) of FIG. 9 may be structures of a frame transmitted to a plurality of communication nodes (i.e., multi-users, MU). According to the structures of (c) and (d) of FIG. 9, the communication node may receive the L-STF, L-LTF, L-SIG (and/or 11bd preamble) among the preambles of the frame from another communication node through the 10 MHz primary channel, and may further receive an indicator through the 10 MHz primary channel. The indicator of the frame transmitted to a plurality of communication nodes may be an indicator (i.e., 20 MHz MU indicator) indicating support of communication with multiple users through the 20 MHz channel. The communication nodes receiving the indicator may confirm that reception of a data part having an OFDMA structure is scheduled. A transmission period of the indicator may be a period for switching a channel mode of the terminal.

The structure of the data part of the frame may be the same as an OFDMA channel structure defined in the IEEE 802.11ax. Accordingly, a front part of the data part may further include an IEEE 802.11ax preamble for high efficiency (HE) communication. The communication nodes receiving the IEEE 802.11ax preamble of the frame may communicate with other communication nodes through respective subchannels.

Figure 10:
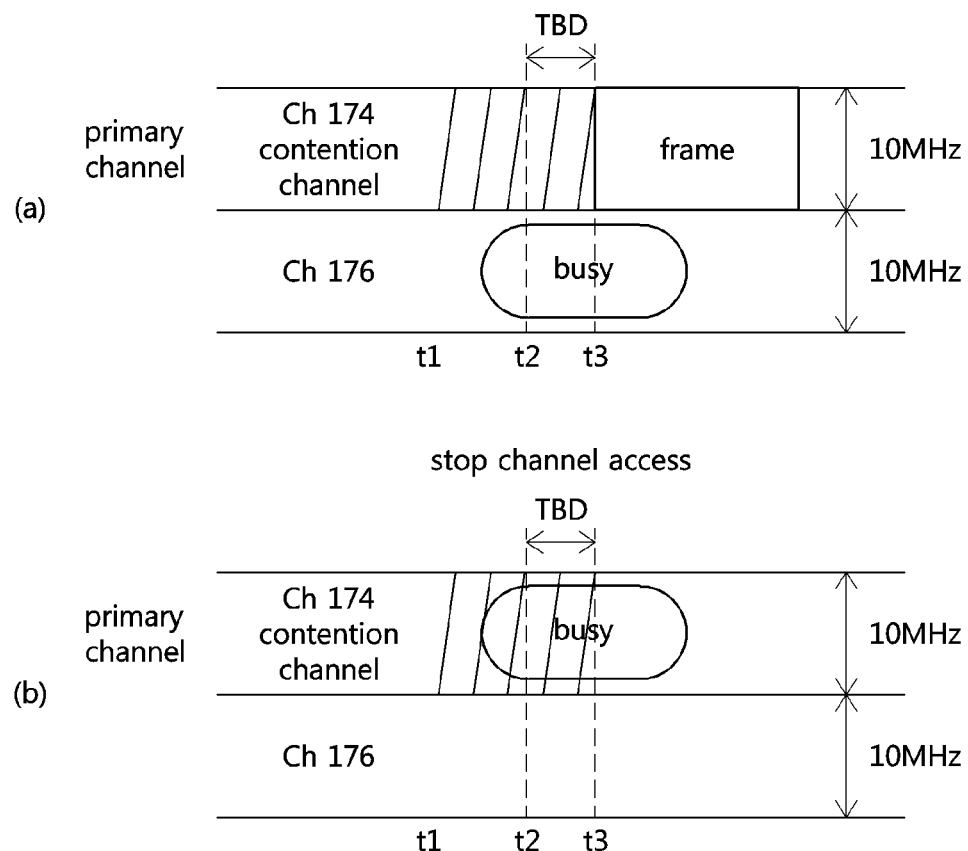
FIG. 10 is a conceptual diagram illustrating a first exemplary embodiment of an operation of a communication node that dynamically extends a channel by dividing the channel into a contention channel and a service channel.

FIG. 10 is a conceptual diagram illustrating a first exemplary embodiment of an operation of a communication node that dynamically extends a channel by dividing the channel into a contention channel and a service channel.

As shown in FIG. 10, a communication node may transmit a frame through two channels (e.g., channel 174 and channel 176). One channel of the two channels may be a service primary channel, which is a channel to be used if an original frame is transmitted on a 10 MHz channel, and the other channel may be a service secondary channel for extension of the service primary channel. The communication node may configure one of the two channels as a channel for contention (hereinafter referred to as a 'contention channel') independently of the configuration of the service primary channel and the service secondary channel. That is, the communication node may configure one of the service primary channel and the service secondary channel as the contention channel, and may perform contention to acquire a frame transmission opportunity in the contention channel. A channel other than the channel configured as the contention channel among the service primary channel or the service secondary channel may be configured as a channel for extending the contention channel (hereinafter, referred to as a 'contention extension channel').

According to the exemplary embodiment of FIG. 10, the communication node may configure the service primary channel as the contention channel and the service secondary channel as the contention extension channel. The communication node may perform contention to acquire a frame transmission opportunity in the contention channel. For example, the communication node may perform a random backoff operation on the contention channel (i.e., t1 to t3). In addition, the communication node may perform a channel monitoring operation on the contention extension channel during a preset time period (e.g., PIFS, etc.) (i.e., t2 to t3). An ending time of the preset time period may be the same as a completion time of the random backoff operation on the contention channel.

The communication node may determine whether to transmit a frame and whether to extend the channel based on a result of the random backoff operation on the contention channel and a result of the channel monitoring operation on the contention extension channel. For example, if the contention extension channel is occupied by another communication node during the preset time period t2 to t3, the communication node may not extend the channel. Accordingly, the communication node may perform fallback transmission of the frame through the service primary channel. On the other hand, if the service primary channel is occupied by another communication node (i.e., t2 to t3), the communication node may stop the channel access procedure on the service primary channel that is the contention channel. That is, the communication node may transmit the frame only when a frame transmission opportunity is acquired as a result of the contention in the contention channel.

Figure 11:
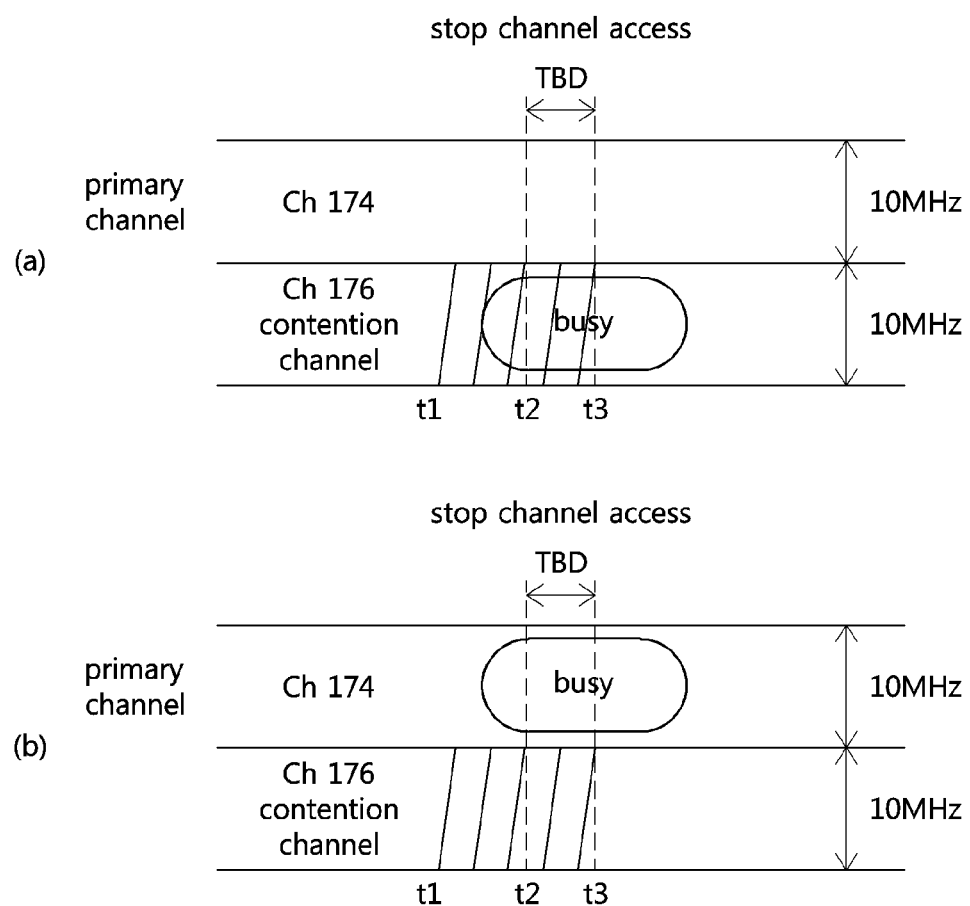
FIG. 11 is a conceptual diagram illustrating a secondary exemplary embodiment of an operation of a communication node that dynamically extends a channel by dividing the channel into a contention channel and a service channel.

FIG. 11 is a conceptual diagram illustrating a secondary exemplary embodiment of an operation of a communication node that dynamically extends a channel by dividing the channel into a contention channel and a service channel.

As shown in FIG. 11, a communication node may transmit a frame through two channels (e.g., channel 174 and channel 176). One channel of the two channels may be a service primary channel, which is a channel to be used if an original frame is transmitted on a 10 MHz channel, and the other channel may be a service secondary channel for extension of the service primary channel. The communication node may configure one of the two channels as a channel for contention (hereinafter referred to as a 'contention channel') independently of the configuration of the service primary channel and the service secondary channel. That is, the communication node may configure one of the service primary channel and the service secondary channel as the contention channel, and may perform contention to acquire a frame transmission opportunity in the contention channel. A channel other than the channel configured as the contention channel among the service primary channel or the service secondary channel may be configured as a channel for extending the contention channel (hereinafter, referred to as a 'contention extension channel').

According to the exemplary embodiment of FIG. 11, the communication node may configure the service primary channel as the contention channel and the service secondary channel as the contention extension channel. The communication node may perform contention to acquire a frame transmission opportunity in the contention channel. For example, the communication node may perform a random backoff operation in the contention channel (i.e., t1 to t3). In addition, the communication node may perform a channel monitoring operation on the contention extension channel during a preset time period (e.g., PIFS, etc.) (i.e., t2 to t3). An ending time of the preset time period may be the same as a completion time of the random backoff operation in the contention channel.

The communication node may determine whether to transmit a frame and whether to extend the channel based on a result of the random backoff operation on the contention channel and a result of the channel monitoring operation on the contention extension channel. For example, if the contention channel is occupied by another communication node (i.e., t2 to t3), the communication node may stop the access procedure to the contention channel. In addition, when the contention channel is configured differently from the service primary channel, if the contention extension channel is occupied by another communication node for a preset time period (e.g., PIFS, etc.) (i.e., t2 to t3), the communication node may stop the channel access procedure. That is, when the contention channel is configured differently from the service primary channel, the communication node may not perform fallback transmission.

The communication nodes of FIGS. 10 and 11 may configure the service primary channel, service secondary channel, contention channel, and contention extension channel by an upper layer including the data link layer. The communication node may configure one of the two channels as the contention channel based on a congestion level of data communication. Alternatively, the communication node may randomly (or alternately) configure one of the two channels as the contention channel.

Figure 12:
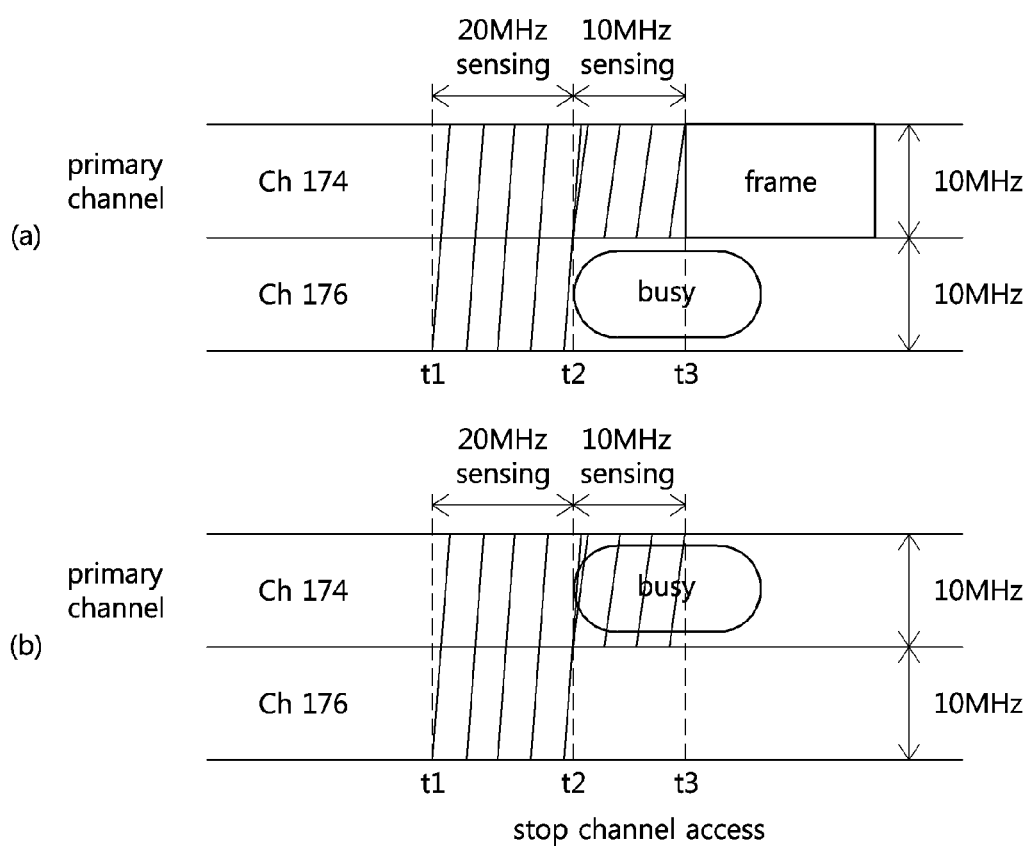
FIG. 12 is a conceptual diagram illustrating a first exemplary embodiment of fallback transmission of a frame through a primary channel as a result of a channel access operation on the primary channel and a secondary channel.

FIG. 12 is a conceptual diagram illustrating a first exemplary embodiment of fallback transmission of a frame through a primary channel as a result of a channel access operation on the primary channel and a secondary channel.

As shown in FIG. 12, a communication node may transmit a frame through two channels (e.g., channel 174 and channel 176). One channel of the two channels may be a primary channel, which is a channel to be used if an original frame is transmitted on a 10 MHz channel, and the other channel may be a secondary channel for extension of the service primary channel, which is contiguous to the primary channel. According to the exemplary embodiment of FIG. 12, the primary channel may be the channel 174, and the secondary channel may be the channel 176. However, it may be obvious that the result of configuring the primary channel is not limited to the exemplary embodiment of FIG. 12. For example, according to another exemplary embodiment, the primary channel may be the channel 176 and the secondary channel may be the channel 174.

A communication node transmitting a frame through a 20 MHz channel may perform channel access on the 20 MHz channel. For example, the communication node may perform a random backoff operation on the primary channel and the secondary channel. A communication node transmitting a frame through an extended channel may perform channel access on a 20 MHz band. That is, the communication node may perform a channel sensing operation on the 20 MHz band during a random backoff time period, and may detect an energy of a frame transmitted by another communication node during the channel sensing operation. The frame transmitted by another communication node may be a 10 MHz frame, so that the communication node may not be able to identify which channel among the primary 10 MHz channel and the secondary 10 MHz channel the frame transmitted by another communication belongs to. Accordingly, the communication node may change the channel on which channel access is performed to the primary channel of the 10 MHz band, and may perform channel sensing on the primary channel during the random backoff time.

According to another exemplary embodiment, the communication node may generate a random backoff count value, and may perform channel sensing operations on the primary channel and the secondary channel during a period (i.e., t1 to t3) corresponding to the generated random backoff count value. The communication node performing the random backoff operation may decrease the random backoff count value only when both the primary channel and the secondary channel are idle. When the communication node completes the random backoff operation on the primary channel and the secondary channel (i.e., t3) (that is, when the random backoff count value becomes zero), the communication node may transmit a frame through the primary channel and the secondary channel.

As shown in (a) of FIG. 12, the communication node may detect a busy state while performing the random backoff operation on the 20 MHz channel. The communication node detecting the busy state may change the channel sensing target channel from the 20 MHz band channel to the 10 MHz band primary channel. The communication node may perform channel sensing during the remaining random backoff time period. As a result of performing the channel sensing operation on the primary channel having 10 MHz bandwidth, if the primary channel is idle during the remaining random backoff time period, the communication node may transmit a frame through the 10 MHz primary channel.

In order to satisfy fairness among communication nodes performing the random backoff operations, the communication node may set the backoff count value on the 10 MHz channel and the backoff count value on the 20 MHz channel differently. For example, the backoff count value set by the communication node may be a backoff count value in the existing 10 MHz channel. Accordingly, the communication node may perform the random backoff operation by doubling the backoff count value (i.e., t1 to t2) in order to perform the random backoff operation on the channels having 20 MHz bandwidth.

In addition, if one channel (e.g., secondary channel) having 10 MHz bandwidth is busy during the random backoff operation on the 20 MHz band channel including two channels each having 10 MHz bandwidth, the communication may continue to perform the random backoff operation performed on the 20 MHz band subsequently on the other channel (e.g., primary channel) having 10 MHz bandwidth (i.e., t2 to t3). The backoff count value on the 10 MHz channel (e.g., primary channel) may be a value reduced to half of the remaining backoff count value that is the result of the random backoff operation on the 20 MHz channel. When the time period corresponding to the half-reduced backoff count value is smaller than a PIFS, the communication node may monitor the 10 MHz channel (e.g., primary channel) during at least a time corresponding to the PIFS to determine whether the channel is idle.

In addition, if the secondary channel is determined to be busy during the random backoff operation on the channel(s) having 20 MHz bandwidth, the communication node may continuously perform the random backoff operation on the unoccupied 10 MHz primary channel (i.e., t2 to t3). Since a backoff count value randomly selected for the initial 10 MHz band channel is doubled and the doubled value is used for the 20 MHz band channel, the backoff count value on the 10 MHz primary channel may be a value obtained by subtracting the backoff count value decreased during the backoff operation on the 20 MHz channel from the backoff value selected for the initial 10 MHz band channel. Since the doubled value is used for the 20 MHz channel, the backoff count value may be decreased much. Therefore, when the remaining backoff count value to be performed on the 10 MHz channel is zero, the communication node may monitor the primary channel during at least a time corresponding to the PIFS in order to determine whether the primary channel is idle.

Referring to (b) of FIG. 12, the communication node may detect whether the primary channel is idle while performing the random backoff operation. The communication node, which recognizes that the primary channel is busy, may stop the channel access operation on the primary channel and the secondary channel.

Figure 13:
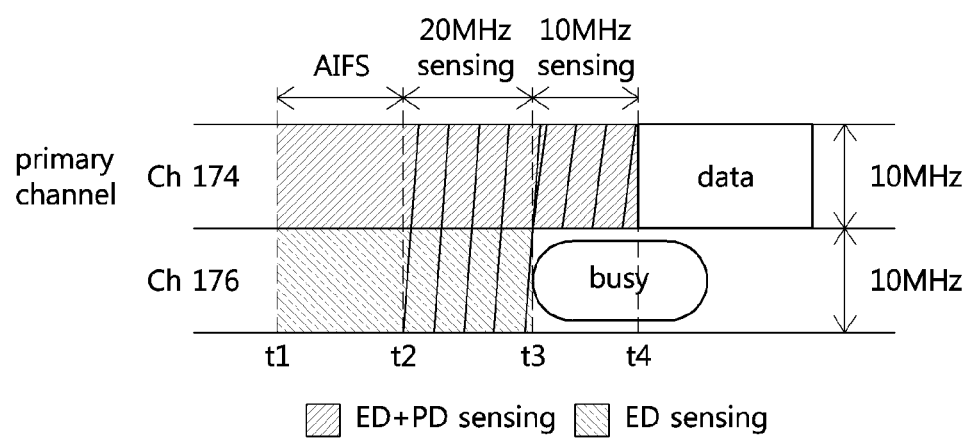
FIG. 13 is a conceptual diagram illustrating a first exemplary embodiment of an operation of a communication node performing channel sensing by dividing a 20 MHz channel into two channels, a 10 MHz primary channel and a 10 MHz secondary channel.

FIG. 13 is a conceptual diagram illustrating a first exemplary embodiment of an operation of a communication node performing channel sensing by dividing a 20 MHz channel into two channels, a 10 MHz primary channel and a 10 MHz secondary channel.

As shown in FIG. 13, a communication node may transmit a frame through a 20 MHz channel composed of two 10 MHz channels (e.g., channel 174 and channel 176). One of the two channels for frame transmission may be a primary channel (i.e., OCB primary channel), and the other channel may be an OCB secondary channel for extension of the primary channel.

The communication node transmitting a frame through the 20 MHz channel composed of two 10 MHz channels may perform a channel access operation on the 20 MHz channel composed of two 10 MHz channels. When the communication node has data to transmit on an extended channel, if a channel occupancy by another communication node is identified on the primary channel or the secondary channel, the communication node may identify channel states for the two channels by performing sensing on the primary and secondary channels until a time after a lapse of a time corresponding to AIFS from a completion time of transmission of the another communication node, and then may perform a random backoff procedure when both of the two channels are idle. For example, the communication node may monitor each of the 10 MHz primary channel and the 10 MHz secondary channel for a preset AIFS (i.e., t1 to t2). When both the primary channel and the secondary channel are idle during the AIFS as a result of monitoring each channel, the communication node may perform a random backoff operation using the same random backoff count value in each of the primary channel and the secondary channel (i.e., t2 to t3). During the AIFS or the random backoff operation on the 20 Hz channel, the communication node may detect presence or absence of a frame transmitted from another communication node in each of the channels. The scheme of identifying a channel occupancy in the 20 MHz band may include, as a carrier sensing (CS) operation, a physical CS operation through energy detection (ED) for each 10 MHz channel, a virtual CS operation through a preamble of a frame or a physical protocol data unit (PPDU) transmitted by another terminal, and an operation of identifying a network allocation vector (NAV) set according to a duration value of a MAC frame header (HDR) of a frame transmitted by another terminal. The communication node may not be able to identify a transmission time (i.e., transmission opportunity (TXOP)) of the frame through the ED operation, and may only determine whether the channel is busy or not. On the other hand, a case in which the TXOP of the frame can be identified by the duration value of the MAC frame header of the frame may be referred to as 'packet detection or preamble detection (PD)'.

The communication node may detect frame transmission from another communication node in each of the primary channel and/or the secondary channel through the sensing scheme such as ED, PD, or a scheme of simultaneously performing ED and PD (i.e., t2 to t3). That is, the communication node may identify the occupancy state of the primary channel and/or the secondary channel while performing the random backoff operation.

The communication node may perform the random backoff operation with one common random backoff count on the 20 MHz band channel including the primary channel and the secondary channel. The communication node may perform a contention operation for channel access to the primary channel. Alternatively, the communication node may perform a packet detection (PD) operation, a virtual detection operation through a preamble of a frame or PPDU transmitted from another terminal, and/or an operation of identifying a NAV set by a frame from another communication node in the primary channel. In addition, the communication node may monitor whether the channel is busy by the ED scheme during a specific period in the secondary channel. The scheme of decreasing the backoff counter on the 20 MHz channel including the primary channel and the secondary channel may be a scheme of performing the PD sensing or simultaneous ED and PD sensing on the primary channel and the ED sensing on the secondary channel, and decreasing the backoff counter by one when both the two channels are idle.

The communication node may detect the occupancy state of the secondary channel during the AIFS or during the random backoff operation on the 20 MHz channel. When a 10 MHz frame transmission operation using only the primary channel is allowed, the communication node recognizing that the secondary channel is busy may continue the random backoff operation on the 10 MHz primary channel of the 20 MHz channel (i.e., t3 to t4), and may stop the random backoff operation on the secondary channel. The communication node completing the random backoff operation on the primary channel may transmit a frame through the primary channel (i.e., t4). The random backoff operation on the primary channel may use a scheme of performing PD sensing or simultaneous ED and PD sensing on the primary channel in each slot during the remaining backoff count performed on the 20 MHz channel, and decreasing the backoff count by one when the primary channel is idle.

Figure 14:
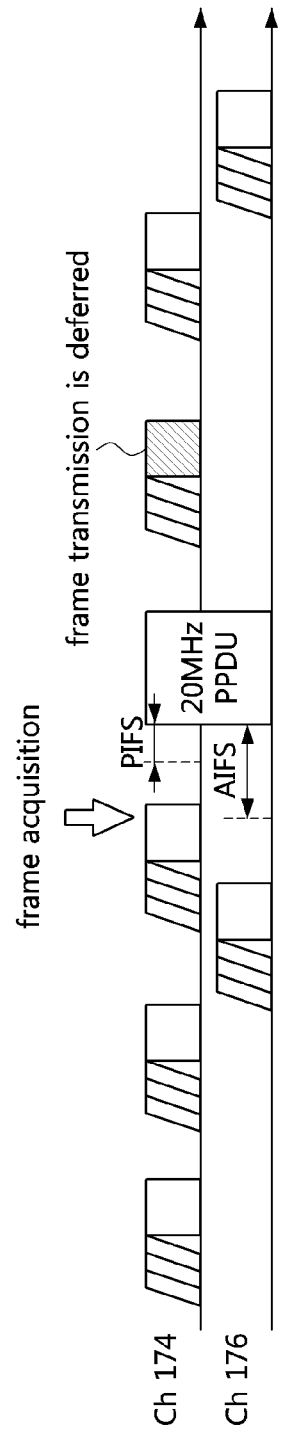
FIG. 14 is a conceptual diagram illustrating a first exemplary embodiment of a result of configuring a primary channel in a communication node based on a channel occupancy ratio in a V2X communication system.

FIG. 14 is a conceptual diagram illustrating a first exemplary embodiment of a result of configuring a primary channel in a communication node based on a channel occupancy ratio in a V2X communication system.

As shown in FIG. 14, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel. In addition, the communication node may perform a carrier sensing operation, which is at least one of the PD operation, ED operation, or NAV value identifying operation on the primary channel, and may identify whether the secondary channel is busy through the ED sensing.

According to an exemplary embodiment of the channel bandwidth extension method, a communication node transmitting a frame through a channel having 20 MHz bandwidth may configure a channel having a low channel occupancy ratio among two channels as a primary channel. For example, when a channel occupancy ratio of the channel 174 is higher than that of the channel 176, the communication node may configure the channel 176 having a relatively low channel occupancy ratio among the channels as a primary channel.

The communication node may perform access to the 176 channel configured as the primary channel. Even when a secondary channel is occupied by another communication node, the communication node may perform access to the primary channel and transmit a signal through the primary channel having 10 MHz bandwidth. Accordingly, the communication node may quickly perform the channel access. In addition, since the communication node may utilize the relatively less congested channel among the channels, the communication node may transmit a signal through the relatively less congested channel. Therefore, the communication node may use the channels efficiently.

The communication node may perform an EDCA procedure to access the primary channel. For example, the communication node may perform channel sensing during an AIFS time period, and if the channel is not occupied by another communication node during the channel sensing period (e.g., AIFS), it may access the primary channel. If a frame is transmitted immediately before the channel sensing operation, or if the channel is determined to be occupied by another communication node as a result of the channel sensing during the AIFS time period, the communication node may additionally perform a random backoff operation after a lapse of the AIFS from the time when the busy state of the channel ends, and then may access the primary channel. In addition, the communication node may identify whether the secondary channel is busy by monitoring the secondary channel. For example, the communication node may monitor the secondary channel during a preset time period (e.g., PIFS, DIFS, AIFS, etc.) before a completion time of the channel access to the primary channel. If the secondary channel is not occupied by another communication node, the communication node may transmit a frame through the primary channel and the secondary channel. On the other hand, as a result of the channel sensing, if the secondary channel is occupied by another communication node, the communication node may transmit a signal through the primary channel having 10 MHz bandwidth.

Figure 15:
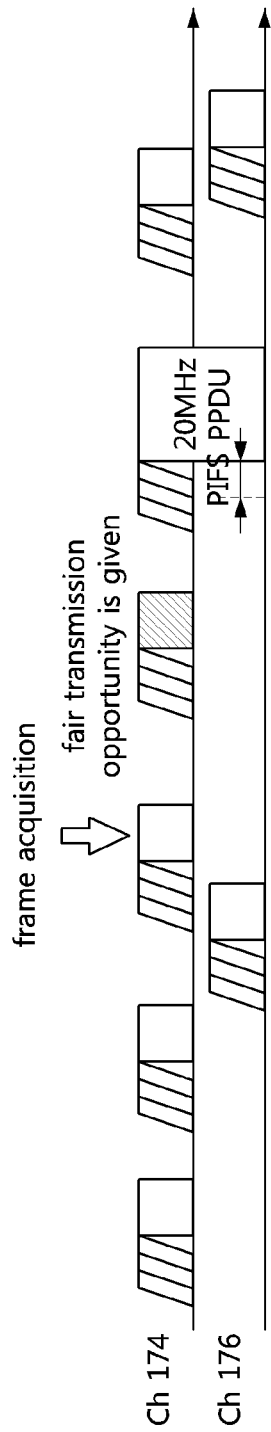
FIG. 15 is a conceptual diagram illustrating a second exemplary embodiment of a result of configuring a primary channel in a communication node based on a channel occupancy ratio in a V2X communication system.

FIG. 15 is a conceptual diagram illustrating a second exemplary embodiment of a result of configuring a primary channel in a communication node based on a channel occupancy ratio in a V2X communication system.

As shown in FIG. 15, each of communication nodes of the V2X communication system may transmit a signal through a radio resource having 20 MHz bandwidth. Specifically, the communication node may transmit the signal through two channels (e.g., channels 174 and 176) each having 10 MHz bandwidth. A communication node transmitting a signal by extending a bandwidth may configure a channel having a high channel occupancy ratio as a primary channel in order to adjust fairness with other communication nodes transmitting a signal through a secondary channel. For example, if a channel occupancy ratio of the channel 174 is higher than that of the channel 176, the communication node may configure the channel 174 as the primary channel.

The communication node may perform an EDCA procedure to access the primary channel. For example, the communication node may perform channel sensing for an AIFS time period, and if the channel is not occupied by another communication node during the channel sensing period (e.g., AIFS), it may access the primary channel. If a frame is transmitted immediately before the channel sensing operation, or if the channel is determined to be occupied by another communication node as a result of the channel sensing during the AIFS time period, the communication node may additionally perform a random backoff operation after a lapse of an AIFS from the time when the busy state of the channel ends, and then may access the primary channel. In addition, the communication node may identify whether the secondary channel is busy by monitoring the secondary channel. For example, the communication node may monitor the secondary channel during a preset time period (e.g., PIFS, DIFS, AIFS, etc.) before a completion time of the channel access to the primary channel. If the secondary channel is not occupied by another communication node during the preset time period, the communication node may transmit a frame through the primary channel and the secondary channel. On the other hand, as a result of the channel sensing, if the secondary channel is occupied by another communication node, the communication node may transmit a signal through the primary channel having 10 MHz bandwidth.

Unlike the exemplary embodiment in FIG. 14, the communication node according to the exemplary embodiment of FIG. 15 may perform a contention procedure for frame transmission with other communication nodes in a channel having a relatively high channel occupancy ratio. Accordingly, according to the exemplary embodiment of FIG. 15, the communication nodes may fairly acquire a channel access opportunity by performing the fair contention procedure.

Figure 16:
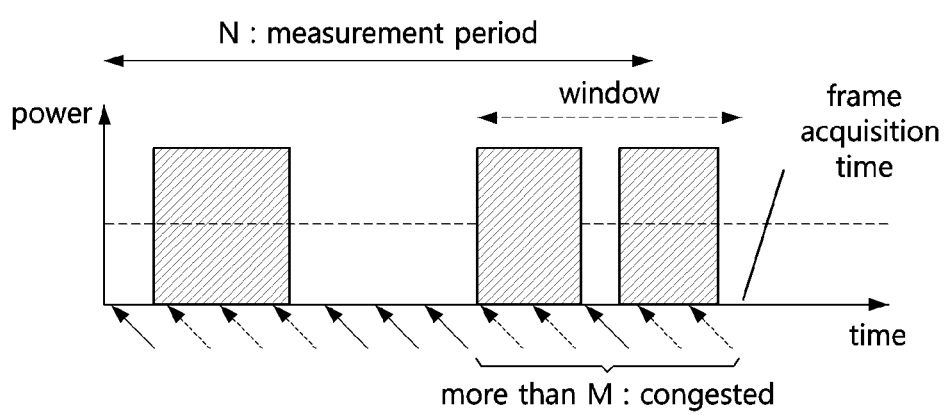
FIG. 16 is a conceptual diagram illustrating an operation of measuring channel occupancy ratio information through a carrier sensing operation in a vehicle terminal.

FIG. 16 is a conceptual diagram illustrating an operation of measuring channel occupancy ratio information through a carrier sensing operation in a vehicle terminal.

As shown in FIG. 16, prior to performing channel access, a communication node may obtain information on occupancy ratios of channels. For example, the MAC layer of the communication node performing channel access may obtain information on a channel load from the upper layer through SAP. For example, the upper layer of the communication node may deliver channel load information to the LLC as a channel load parameter of a DL-UNITDATAX.request primitive through LSAP. In addition, the LLC of the communication node may transmit the channel load parameter to the MAC layer through the MA-UNITDATA.request or MA-UNITDATAX.request of MAC SAP.

Alternatively, the communication node may determine whether a channel is used through the carrier sensing operation, and may measure a channel occupancy ratio based on a result of the carrier sensing operation. For example, during a specific time period, the communication node may perform an energy measurement operation N times, and may calculate the number of times the measured energy value is equal to or greater than a preset range. The communication node may divide the number of times that energy above a specific level is detected by the number of measurements during the specific time period to convert it into the channel occupancy ratio. The communication node may further reflect a weight to the measured channel occupancy ratio value in order to minimize a sudden change in the value of the channel occupancy ratio due to a communication environment and measurement error. The channel occupancy ratio value may be expressed as in Equation 1 below.

$$\text{Estimatedload}_n = (1-a) \times \text{Estimatedload}_{n-1} + a \times \text{Current-load} \qquad \text{[Equation 1]}$$

In Equation 1, a may be a weight value according to a measurement time of the channel occupancy ratio. That is, according to Equation 1, the communication node may set the weight value a to a value between 0 and 1, and may calculate the channel occupancy ratio by summing a value obtained by multiplying the channel load value at the previous time point by (1−a) and a value obtained by multiplying the channel occupancy ratio at the current time point by a.

A communication node located in a place where the environmental change of the communication network is large may set the value a to a value close to 1 (e.g., a number greater than ½) in order to give a high weight to Current-load. On the other hand, a communication node located in a place where the environmental change of the communication network is small may set the value a to a value close to 0 (e.g., a number smaller than ½).

The communication node that continuously performs the carrier sensing operation may determine a state of the channel at the time of data transmission. For example, the communication node that has acquired a frame from the upper layer may determine that the current channel is in a very congested state when an energy measurement result for a specific channel is maintained at a specific level or higher during a specific time period before the time of acquiring the frame, or when the number of times of energy detection above a specific level within a preset time period is 1.5 times or more of the channel load of the previous time.

Figure 17:
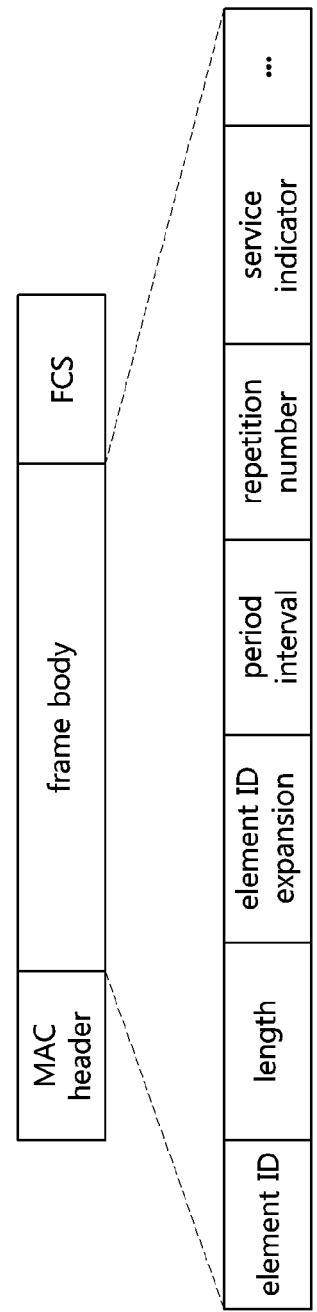
FIG. 17 is a conceptual diagram illustrating a structure of a periodically transmitted frame according to a first exemplary embodiment.
Figure 18:
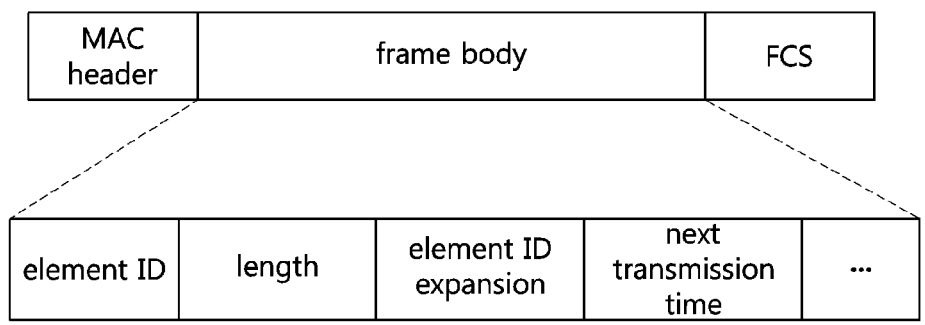
FIG. 18 is a conceptual diagram illustrating a structure of a periodically transmitted frame according to a second exemplary embodiment.

FIG. 17 is a conceptual diagram illustrating a structure of a periodically transmitted frame according to a first exemplary embodiment, and FIG. 18 is a conceptual diagram illustrating a structure of a periodically transmitted frame according to a second exemplary embodiment.

A frame periodically transmitted by communication nodes (e.g., legacy communication node and new communication node) may include a MAC header, a frame body, and an FCS. According to exemplary embodiments of FIGS. 17 to 18, the frame body may further include information on a transmission time of the frame.

According to the exemplary embodiment of FIG. 17, the communication node may obtain information on the transmission time of the frame from the upper layer through the MLME SAP or MAC SAP. The information on the transmission time of the frame may include information on a transmission periodicity, the number of repetitions, and a data type (or service type).

The frame transmission method according to the exemplary embodiment of FIG. 17 may be applied to a periodically transmitted frame, but it may be difficult to apply it to a case where a periodicity of the frame is frequently changed.

According to the exemplary embodiment of FIG. 18, the communication node may obtain information on the transmission time of the frame from the upper layer through the MLME SAP or MAC SAP. The information on the transmission time of the frame may include information on a transmission time and a data type (or service type) of the next frame. The information of the transmission time of the next frame may be changed according to the data type (e.g., cooperative awareness message (CAM), etc.) or a congestion control operation.

The communication node may generate the frame including the information on the transmission time of the frame (e.g., transmission periodicity, repetition number, data type, and next transmission time) according to the structure of FIG. 17 or 18. The information on the transmission time of the frame may be included in the frame in form of an information element. The communication node may transmit the generated frame to another communication node.

A communication node receiving the frame according to the structure of FIG. 17 or 18 may obtain the information on the transmission time of the frame from the frame. The communication node may identify a next transmission time of a frame corresponding to a specific service based on the obtained information on the transmission times of the frames. When the communication node can identify the transmission time of the periodic frame, the communication node may predict a channel occupancy situation according to the periodic frame transmission. If the channel occupancy condition exceeds a preset range at the time at which the communication node obtains the frame, the communication node may determine that the channel is congested.

Figure 19:
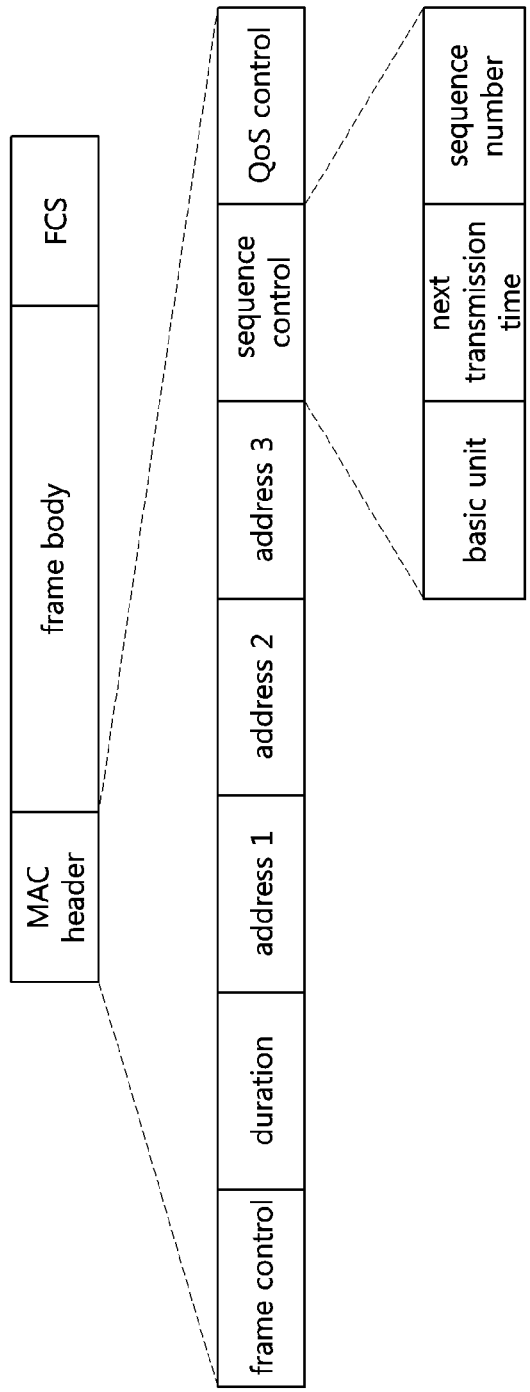
FIG. 19 is a conceptual diagram illustrating a structure of a periodically transmitted frame according to a third exemplary embodiment.
Figure 20:
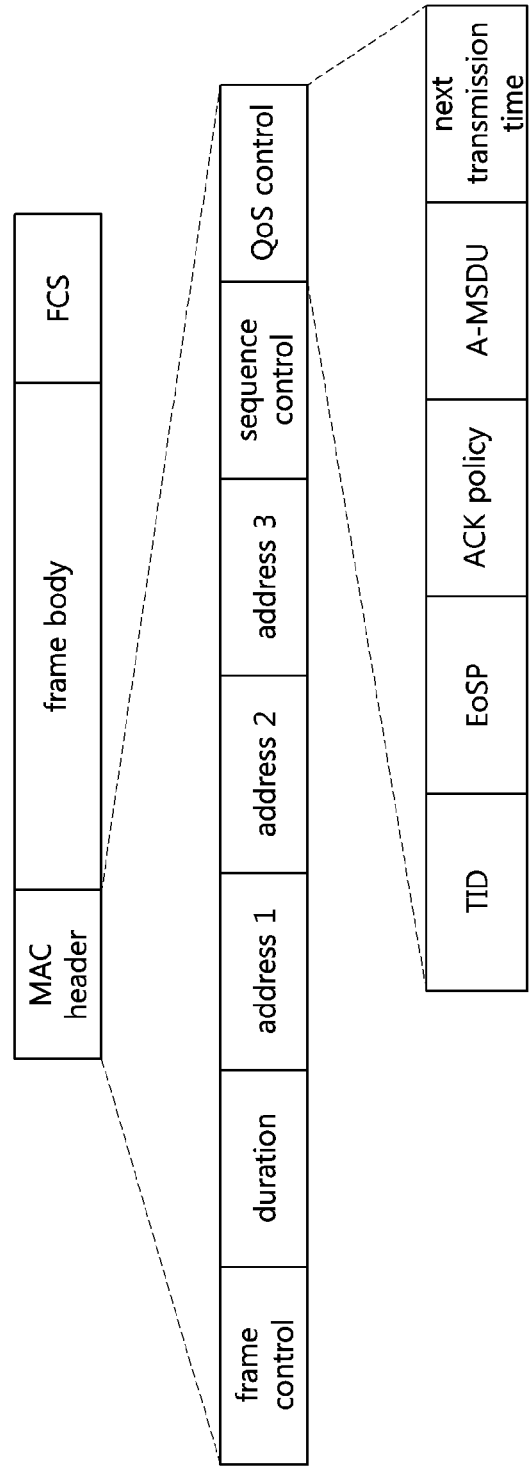
FIG. 20 is a conceptual diagram illustrating a structure of a periodically transmitted frame according to a fourth exemplary embodiment.

FIG. 19 is a conceptual diagram illustrating a structure of a periodically transmitted frame according to a third exemplary embodiment, and FIG. 20 is a conceptual diagram illustrating a structure of a periodically transmitted frame according to a fourth exemplary embodiment.

A MAC header of each of frames transmitted by communication nodes (e.g., legacy communication node and new communication node) may include a frame control field, a duration field, at least one or more receiver address fields, a sequence control field, and a quality of service (QoS) control field. According to the exemplary embodiments of FIGS. 19 to 20, the MAC header of the frame may further include information on a transmission time of the frame.

Referring to FIG. 19, the sequence control field may further include information on a transmission time of the next frame. The sequence control field of the conventional frame may include a fragment number field and a sequence number field. However, according to the exemplary embodiment of FIG. 19, the fragment number field may be set to a non-zero value. In addition, the sequence number field of the sequence control field may be reduced to 8 bits, and the remaining 6 bits may indicate the information on the transmission time of the next frame.

A communication node receiving the frame according to FIG. 19 may receive the frame in which the value of the fragment field of the MAC header is non-zero. The communication node may identify that the MAC header further includes the information on the transmission time of the next frame. The communication node may obtain the information on the transmission time of the next frame from the fragment number field and a part of the sequence control field of the frame.

As shown in FIG. 20, the QoS control field may further include information on a transmission time of the next frame. Specifically, the MAC header may include a traffic identifier (TID) field indicating a traffic ID, an end of service period (EOSP) field indicating an end of a service period, an ACK policy field, and aggregated MAC service data unit (A-MSDU) field. The TID of the MAC header including information on the transmission time of the next frame may indicate priority information of the frame. The EOSP field of the MAC header may include one bit, and the bit of the EOSP field may be set to 0. The ACK policy field of the MAC header may include two bits, and they may be set to 1 and 0, respectively. The A-MSDU field of the MAC header may include one bit, and the bit of the A-MSDU field may be set to 0.

In addition, the MAC header may indicate information on the transmission time of the next frame through a next transmission time information field including the last plurality (e.g., 8) bits of the QoS control field. According to the conventional frame, the plurality of bits of the next transmission time information field may include information on a transmission opportunity of the communication node. In case of vehicle-to-vehicle communication, since the frame may not include information on a transmission opportunity of communication nodes, the plurality of bits of the next transmission time information field may be set to 0. However, according to the exemplary embodiment of FIG. 20, the plurality of bits of the next transmission time information field may be set to a non-zero value, and specifically, they may include information on the transmission time of the next frame of the communication node. The information on the transmission time of the frame may indicate a specific number in fixed units (e.g., 1 ms unit), or may further include information on the transmission time of the frame and the unit.

A communication node receiving the frame according to FIG. 20 may receive the frame in which the values of the last plurality of bits among the vehicle communication frame are not 0 through the QoS control field of the MAC header. During vehicle communication, the communication node may identify that the next frame transmission time information is further included in the corresponding field according to the information included in the QoS control field of the MAC header. The communication node may obtain the information on the transmission time of the next frame from the frame.

Figure 21:
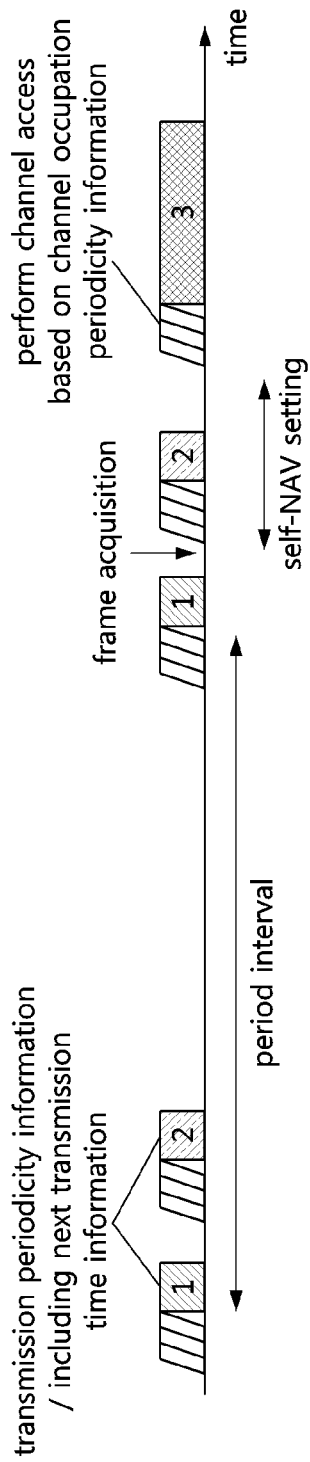
FIG. 21 is a conceptual diagram illustrating an exemplary embodiment of an operation of a communication node performing a channel access procedure based on channel occupancy ratio information.

FIG. 21 is a conceptual diagram illustrating an exemplary embodiment of an operation of a communication node performing a channel access procedure based on channel occupancy ratio information.

As shown in FIG. 21, a communication node may detect frames from other communication nodes during a predetermined time period. Each of the frames from other communication nodes may further include information on a transmission time of the frame. The communication node may predict a channel occupancy ratio and a channel state at the time of acquiring the frame based on a periodicity indicated by the information on the transmission time of each of the frames, etc.

The communication node may perform operations based on the EDCA as in the existing wireless LAN. In addition, when a channel load of a specific channel exceeds a preset range, in order to avoid frame collision, the communication node may perform a collision avoidance operation. For example, the upper layer of the communication node may deliver channel load information to the LLC sublayer as a channel load parameter of a DL-UNITDATAX.request primitive through LSAP. In addition, the LLC of the communication node may deliver the channel load parameter to the MAC layer through a MA-UNITDATA.request or MA-UNITDATAX.request primitive of the MAC SAP, which further includes the channel load parameter.

The communication node performing the congestion avoidance operation based on the channel load value may determine a channel occupancy ratio and a channel state at the time when data transmission is requested from the upper layer. If the channel is congested as a result of determining the channel occupancy ratio and the channel state, the communication node may delay frame transmission. The communication node may determine the channel occupancy ratio and the state of the channel based on the carrier sensing, the result of detecting the frame, and the information on the transmission time of the received frame. The communication node may predict the channel occupancy ratio and the channel state by additionally reflecting reception status information of the detected frame. For example, the communication node may reflect a weight when calculating the channel occupancy ratio and the channel state based on reception status information (e.g., RSSI, etc.) of the detected frame.

When the channel occupancy ratio is equal to or greater than a preset value, the communication node may set a NAV by itself (i.e., self NAV) to perform a congestion avoidance operation through a random delay. Alternatively, if the channel is expected to be congested at the time of transmission based on the information on the transmission time of the received frame, the communication node may set a NAV by itself and perform a congestion avoidance operation through a random delay. The communication node may not transmit a frame during the set NAV period.

The random delay value may be within a range preset according to the channel state. For example, when the channel state is classified into three stages of congested, lightly-congested, and non-congested states according to the occupancy ratio of the channel, three random delay values may be preset. The communication node may set the NAV based on one random delay value among three random delay values based on the channel state (one of congested, lightly-congested, and non-congested).

Alternatively, the communication node may set the setting range of the random delay differently according to a form of the frame payload (e.g., service class, etc.). For example, when transmitting a basic safety message (BSM) including a notification (e.g., event flag) for a specific emergency situation, a priority of the message (e.g., user priority) may be set to a high number. Based on the priority information, the communication node may not perform the congestion avoidance operation. Alternatively, the communication node performing the congestion avoidance operation may have a relatively low random delay time (e.g., within 300 ms). On the other hand, when transmitting a frame including data that does not significantly affect safety, such as a general location message or a navigation message, the priority of the frame may be set to be relatively low. The communication node that transmits the low-priority frame may have a relatively long time (e.g., within 1,000 ms) of random delay.

When the occupancy ratio of the channel is equal to or greater than a preset value, the communication node may always perform the congestion avoidance operation through an additional random delay. Alternatively, the communication node may perform the congestion avoidance operation probabilistically according to the occupancy ratio of the channel. For example, when the channel occupancy ratio is 0.3 or more, the communication node transmitting the frame may further perform the congestion avoidance operation through a random delay with a probability of 50%. When the channel occupancy ratio is 0.5 or more, the communication node transmitting the frame may further perform the congestion avoidance operation through the random delay with a probability of 75%. Also, when the channel occupancy ratio is 0.7 or more, the communication node transmitting the frame may always further perform the congestion avoidance operation through the random delay.

The communication node may not perform the frame transmission operation during the set NAV period. After a lapse of the NAV, the communication node may perform a channel sensing operation before transmitting the frame. The communication node may perform a channel monitoring operation or a random backoff operation. When the channel is determined to be idle as a result of the channel sensing operation, the communication node may transmit the frame.

Figure 22:
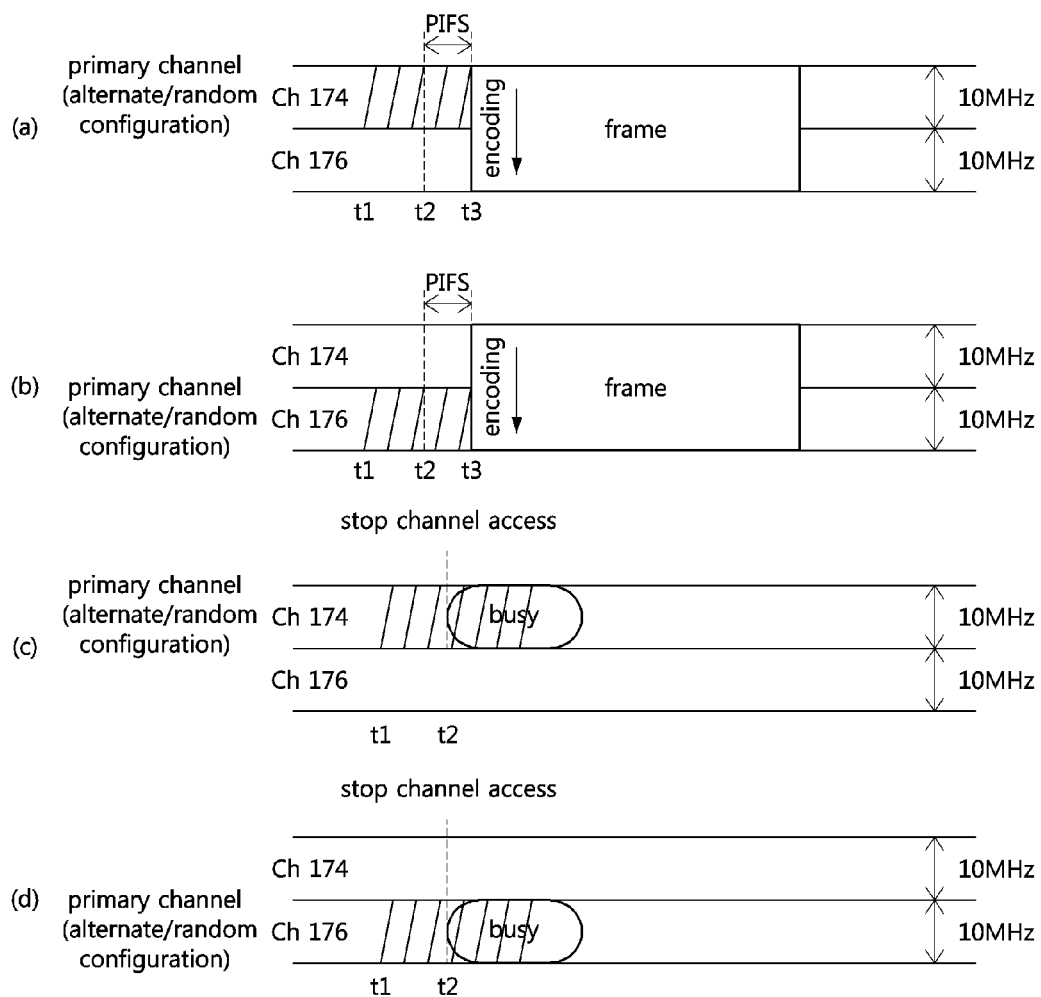
FIG. 22 is a conceptual diagram illustrating a first exemplary embodiment of an operation of a communication node for transmitting a signal in a 20 MHz bandwidth in a V2X communication system.

FIG. 22 is a conceptual diagram illustrating a first exemplary embodiment of an operation of a communication node for transmitting a signal in a 20 MHz bandwidth in a V2X communication system.

As shown in FIG. 22, a communication node may transmit a frame through two channels (e.g., channel 174 and channel 176). The communication node may configure one of the two channels as a channel for contention (hereinafter referred to as a 'contention channel') independently of configuration of primary and secondary channels. That is, the communication node may compete to acquire a frame transmission opportunity in one of the primary channel or the secondary channel.

According to the exemplary embodiment of FIG. 22, the communication node may select one of the two channels each having 10 MHz bandwidth as the contention channel. In addition, the communication node may perform a channel contention operation on the selected contention channel. The communication node may select the contention channel by alternately selecting the two channels. Alternatively, the communication node may probabilistically select one of the two channels as the contention channel.

The communication node may select one of the two channels as the contention channel with the same probability. For example, the communication node may generate a random number of either 0 or 1. If the random number is 0, the communication node may select a channel having a lower number (e.g., channel 174 in the exemplary embodiment) as the contention channel, and if the random number is 1, the communication node may select a channel having a higher number (e.g., channel 176 in the exemplary embodiment) as the contention channel.

Alternatively, the communication node may generate a random number of 0 to 9. If the random number is one of 0 to 4, the communication node may select a channel having a lower number (e.g., channel 174 in the exemplary embodiment) as the contention channel, and if the random number is one of 5 to 9, the communication node may select a channel having a higher number (e.g., channel 176 in the exemplary embodiment) as the contention channel.

The communication node may select one of the two channels as the contention channel with different probabilities. Specifically, the communication node may determine a contention channel selection probability of each of the two channels based on the channel occupancy ratio thereof. The communication node may set a probability p for a channel with a higher channel occupancy ratio among the two channels. The probability p may be classified into several levels according to the channel occupancy ratio of the corresponding channel. The communication node may calculate the channel occupancy ratio based on information on a channel state observed for a predetermined time. Alternatively, the Wireless Access in Vehicular Environments Short Message Protocol (WSMP) layer of the communication node may calculate each channel occupancy ratio based on the channel state of the contention channel.

For example, when the channel state is classified into three states including congested, lightly congested, and non-congested states according to the congestion degree, the contention channel selection probability of the channel may be set differently according to a degree of congestion. For example, when a congestion degree of a specific channel is the congested state, the contention channel selection probability of the specific channel may be set to 1/6, when the congestion degree of the specific channel is the lightly congested state, the contention channel selection probability of the specific channel may be set to 2/6, and when the congestion degree of the specific channel is the non-congested state, the contention channel selection probability of the specific channel may be set to 3/6. When the contention channel selection probability value of the specific channel is set to p, the communication node may set a contention channel selection probability of the other channel to 1-p. That is, when a state of one channel is the congested state, a contention channel selection probability of the other channel may be 5/6.

In addition, the communication node may generate a random number value between 0 and 1, and may select the contention channel based on the random number value. For example, if the channel 176 has a higher usage rate than the channel 174 and the channel 176 is in the congested state, the communication node obtaining a random number value less than 1/6 may select the channel 176 as the contention channel. In addition, the communication node obtaining a random number value equal to or greater than 1/6 may select the channel 174 as the contention channel. If a state of one channel is the non-congested state, the channel selection probability of each of the two channels may be equal to each other.

The communication node may determine a channel occupancy ratio of the primary channel by referring to a primary channel state in the WSMP layer that is the upper layer, or determine the channel occupancy ratio of the primary channel based on a result of channel state observation during a preset time period.

The communication node may compete to acquire a frame transmission opportunity on the contention channel. For example, the communication node may perform a random backoff operation on the contention channel (i.e., t1 to t3). In addition, the communication node may monitor a channel to be extended and monitor a channel occupancy state of the channel during a preset time period (e.g., PIFS, etc.) (i.e., t2 to t3).

The communication node may determine whether to transmit a frame based on a result of the random backoff operation on the contention channel. For example, the communication node may complete the random backoff operation on the contention channel, and if the extended channel is idle during a PIFS period, the communication node may transmit a frame through a 20 MHz channel. In the present disclosure, when a frame is transmitted through a 20 MHz channel, data of the frame may be mapped from a radio resource indicated by a low channel number.

On the other hand, if the communication node detects the busy state of the contention channel during the random backoff operation, the communication node may stop the access procedure to the contention channel. On the other hand, if the communication node detects the busy state of the contention channel during the random backoff operation, the communication node may stop the access procedure to the contention channel.

Figure 23:
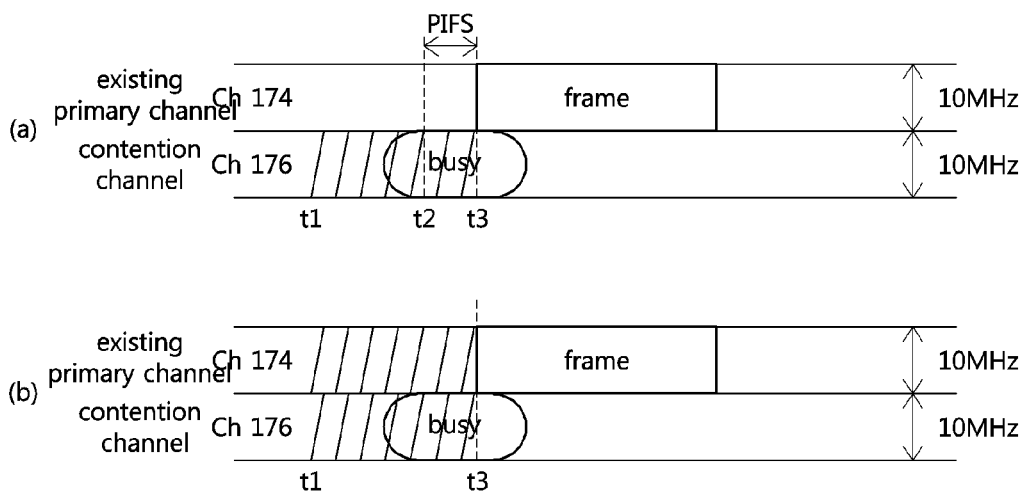
FIG. 23 is a conceptual diagram illustrating a second exemplary embodiment of an operation of a communication node for transmitting a signal in a 20 MHz bandwidth in a V2X communication system.

FIG. 23 is a conceptual diagram illustrating a second exemplary embodiment of an operation of a communication node for transmitting a signal in a 20 MHz bandwidth in a V2X communication system.

As shown in FIG. 23, a communication node may transmit a frame through two channels (e.g., channel 174 and channel 176). One of the two channels for frame transmission may be a primary channel, and the other channel may be a secondary channel capable of replacing the primary channel. The primary channel among the two channels may be defined according to the existing specification or according to a service type of the frame to be transmitted. The primary channel defined in the existing specification may be referred to as an 'existing primary channel'. In addition, the communication node may determine the contention channel for performing channel access based on a channel occupancy state of each of the channels (e.g., primary channel and secondary channel). For example, the communication node may configure the channel 176, which is a separate channel from the existing primary channel, as the primary channel based on the occupancy state of each of the channels. The channel 176 newly configured by the communication node may be referred to as a contention channel.

According to the exemplary embodiment of FIG. 23, the communication node may compete to acquire a frame transmission opportunity on the contention channel. For example, the communication node may perform a random backoff operation on the contention channel (i.e., t1 to t3). In addition, the communication node may perform a frame transmission operation on the existing primary channel if the contention channel is busy while performing the contention to acquire a frame transmission opportunity on the contention channel. For example, referring to (a) of FIG. 23, the communication node may perform a random backoff operation on the contention channel, and if the contention channel is busy while performing the random backoff operation, the communication may monitor a channel occupancy state of the existing primary channel during a preset time period (e.g., PIFS, etc.) before the time at which the random backoff ends on the contention channel (i.e., t2 to t3). In addition, referring to (b) of FIG. 23, the communication node may monitor the channel occupancy state of the existing primary channel for the entire random backoff period to be performed on the contention channel (i.e., t1 to t3).

The communication node may determine a channel through which to transmit the frame based on a result of the random backoff operation on the contention channel. For example, according to the exemplary embodiments of (a) and (b) of FIG. 23, if the contention channel is occupied by another communication node during the backoff procedure on the contention channel, the communication node may transmit the frame through the existing primary channel when the existing primary channel is idle during a preset time period (e.g., PIFS, etc.) before a completion time of the random backoff to be performed on the contention channel or during the entire period of the random backoff to be performed on the contention channel.

Figure 24:
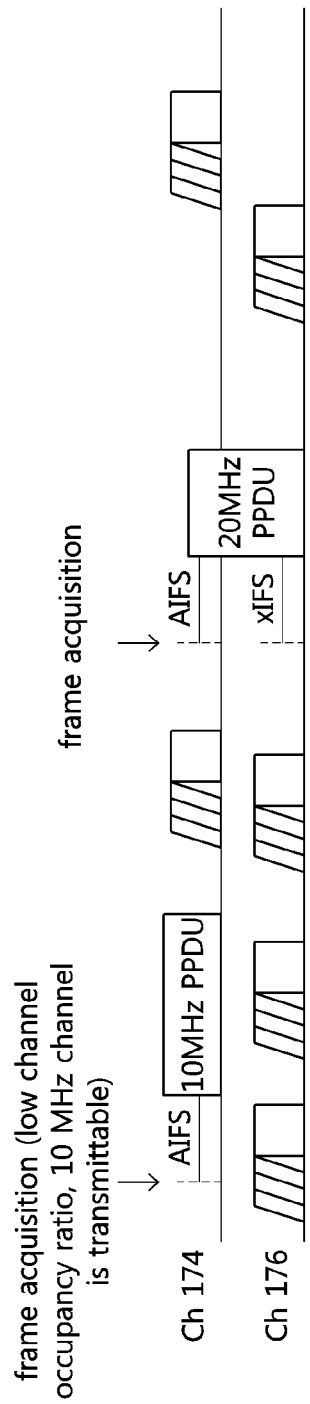
FIG. 24 is a conceptual diagram illustrating a first exemplary embodiment of a frame transmission operation based on a comparison result of a channel occupancy ratio of a primary channel and a channel occupancy ratio of a secondary channel.

FIG. 24 is a conceptual diagram illustrating a first exemplary embodiment of a frame transmission operation based on a comparison result of a channel occupancy ratio of a primary channel and a channel occupancy ratio of a secondary channel.

As shown in FIG. 24, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may acquire a first frame to be transmitted from the upper layer. When the primary channel is in the idle state, the communication node may identify whether the channels are occupied by monitoring the channels (e.g., primary channel and/or secondary channel) during a preset AIFS time period. For example, the communication node may monitor the primary channel by performing a PD operation on the primary channel, and may monitor the secondary channel by performing an ED operation on the secondary channel.

As a result of the channel monitoring, if the primary channel is idle during the preset AIFS period and the secondary channel is occupied by another communication node, the communication node may compare a channel occupancy ratio of the primary channel with a channel occupancy ratio of the secondary channel. The channel occupancy ratio may indicate a channel occupancy ratio (%) during a predetermined time and the number of terminals having performed transmission during the predetermined time. The channel occupancy ratio may be a value periodically measured by the communication node and reported to the upper layer. The channel occupancy ratio may be the value reported periodically by the communication node as it is or a value notified again by the upper layer through statistics. In addition, when a ratio of the occupancy ratio of the primary channel to the occupancy ratio of the secondary channel is less than a preset level, the communication node may allow fallback transmission of the frame through the primary channel of a 10 MHz bandwidth. The preset level may be a value notified by the upper layer through a primitive. The fallback transmission may be performed when allowed by the upper layer through a primitive. Accordingly, the communication node that has performed the channel access operation on the primary channel may perform fallback transmission of the frame through the primary channel of the 10 MHz bandwidth. If the upper layer allows fallback transmission through the primitive and the upper layer places restrictions on the occupancy ratio, the communication node may perform fallback transmission of the frame. The restrictions on the occupancy ratio may be replaced with a fallback allowance condition. The communication node may receive configuration values such as a channel occupancy ratio setting value, whether fallback transmission is allowed, and whether 20 MHz transmission is allowed, from a user in form of an MIB through an SME or from the upper layer.

The communication node may obtain a second frame to be transmitted from the upper layer. When the primary channel is in the idle state, the communication node may identify whether the channels (e.g., primary channel and/or secondary channel) are occupied by monitoring the channels during a preset IFS time period. Specifically, the communication node may monitor the primary channel during the preset AIFS time period and monitor the secondary channel during a preset xIFS time period to identify whether the channels are occupied.

As a result of the channel monitoring, if the primary channel is idle for the preset AIFS time period and the secondary channel is idle during the preset xIFS time period, the communication node may transmit a frame through the primary channel and the secondary channel.

Figure 25:
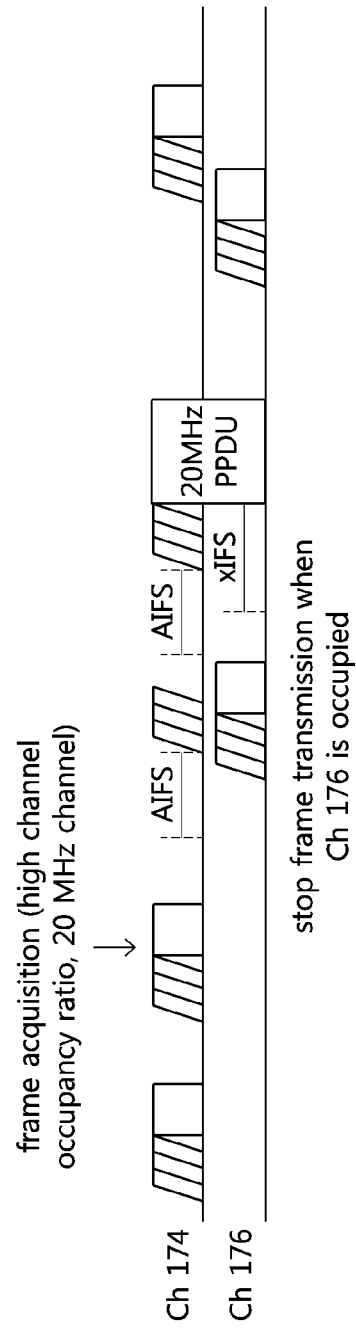
FIG. 25 is a conceptual diagram illustrating a second exemplary embodiment of a frame transmission operation based on a result of comparison between a channel occupancy ratio of a primary channel and a channel occupancy ratio of a secondary channel.

FIG. 25 is a conceptual diagram illustrating a second exemplary embodiment of a frame transmission operation based on a result of comparison between a channel occupancy ratio of a primary channel and a channel occupancy ratio of a secondary channel.

As shown in FIG. 25, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may acquire a first frame to be transmitted from the upper layer. When the primary channel is in the idle state, the communication node may identify whether the channels (e.g., primary channel and/or secondary channel) are occupied by monitoring the channels during a preset AIFS time period. For example, the communication node may monitor the primary channel by performing a PD operation on the primary channel, and may monitor the secondary channel by performing an ED operation on the secondary channel.

As a result of the channel monitoring, if the primary channel is idle during the preset AIFS time period, and the secondary channel is occupied by another communication node, the communication node may compare a channel occupancy ratio of the primary channel with a channel occupancy ratio of the secondary channel. The channel occupancy ratio may indicate a channel occupancy ratio (%) during a predetermined time and the number of terminals having transmitted during the predetermined time. The channel occupancy ratio may be a value periodically measured by the communication node and reported to the upper layer. The channel occupancy ratio may be a value reported periodically by the communication node as it is or a value notified again by the upper layer through statistics. In addition, when a ratio of the occupancy ratio of the primary channel to the occupancy ratio of the secondary channel is less than a preset level, the communication node may allow fallback transmission of the frame through the primary channel having a 10 MHz bandwidth. The preset level may be a value notified by the upper layer through a primitive. The fallback transmission may be performed when allowed through the primitive from the upper layer. Accordingly, the communication node that has performed the channel access operation on the primary channel may perform the fallback transmission of the frame through the primary channel having a 10 MHz bandwidth. If the upper layer allows the fallback transmission through the primitive and the upper layer places a restriction on the occupancy ratio, the communication node may perform fallback transmission of the frame. The restriction on the occupancy ratio may be replaced with a fallback allowance condition. The communication node may receive configuration values such as the channel occupancy ratio configuration value, whether the fallback transmission is allowed, whether 20 MHz transmission is allowed, and/or the like from the user in form of an MIB through the SME or from the upper layer.

The communication node may detect the idle state of the secondary channel. When the channels (e.g., primary channel and secondary channel) are idle, the communication node may perform a channel access procedure on the channels. Specifically, the communication node may perform a random backoff operation after monitoring the primary channel during a preset AIFS time period. In addition, the communication node may identify whether the channels are occupied by monitoring the secondary channel for a preset xIFS time period until the random backoff in the primary channel is completed.

When the communication node completes the random backoff operation on the primary channel and the secondary channel is idle during the preset xIFS time period, the communication node may transmit a frame through the primary channel and the secondary channel.

Figure 26:
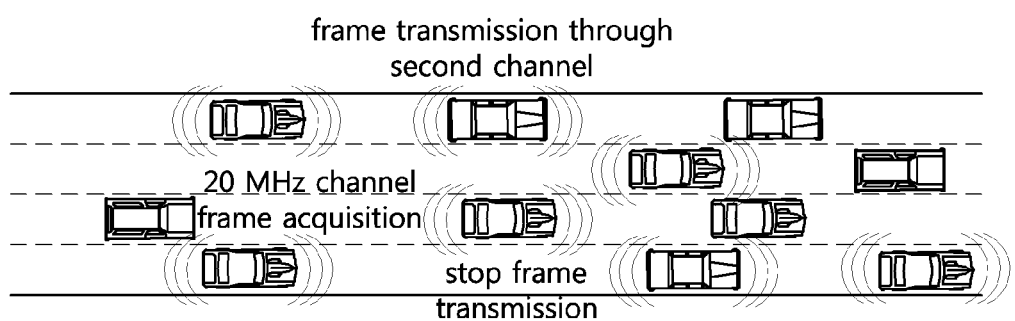
FIG. 26 is a conceptual diagram illustrating a first exemplary embodiment of a frame transmission operation based on an RSSI of a frame transmitted through a secondary channel.

FIG. 26 is a conceptual diagram illustrating a first exemplary embodiment of a frame transmission operation based on an RSSI of a frame transmitted through a secondary channel.

A communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

As shown in FIG. 26, the communication node may acquire a first frame to be transmitted from the upper layer. When the primary channel is in the idle state, the communication node may identify whether the channels (e.g., primary channel and/or secondary channel) are occupied by monitoring the channels during a preset AIFS time period. Specifically, the communication node may identify whether the channels (e.g., primary channel and/or secondary channel) are occupied by monitoring the channels during the preset AIFS time period. For example, the communication node may monitor the primary channel by performing a PD operation on the primary channel, and may monitor the secondary channel by performing an ED operation on the secondary channel. The communication node may measure a signal strength of a frame received through the ED operation, and may estimate a distance to the communication node that transmitted the frame based on the measured signal strength. The MAC layer of the communication node may know a result of the ED sensing through an IPI-REPORT parameter in PHY-CCA. indication delivered from the PHY SAP or a parameter indicating the received signal strength.

As a result of the channel monitoring, if the primary channel is idle and the secondary channel is occupied by another communication node during the preset AIFS time period, the communication node may determine whether to use the secondary channel based on the reception status information of the frame occupying the secondary channel. The reception status information of the frame may be a received signal strength indicator (RSSI). For example, when the RSSI of the frame occupying the secondary channel exceeds a preset range, the communication node may determine that a distance from the communication node to another communication node is within a preset range. In case that the communication node performs fallback transmission of the frame through the 10 MHz primary channel, since the distance between them is close, interference may be given to the secondary channel that is a contiguous channel, and frame transmission of the another communication node may be prevented. In order to prevent such the case, the fallback transmission using the primary channel may be not performed. That is, the communication node may not allow the fallback transmission of the frame through the primary channel having the 10 MHz bandwidth, and may wait until the busy state of the secondary channel ends.

Figure 27:
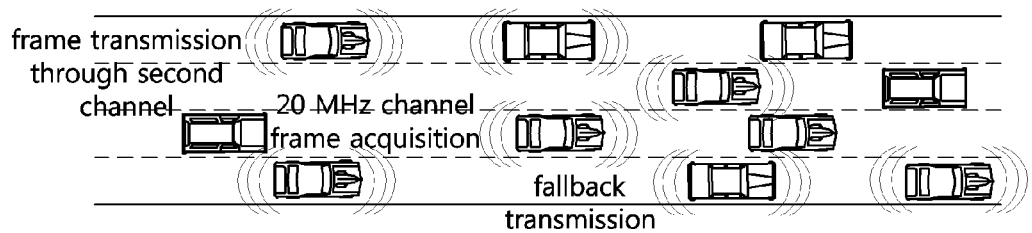
FIG. 27 is a conceptual diagram illustrating a second exemplary embodiment of a frame transmission operation based on reception status information of a frame transmitted through a secondary channel.

FIG. 27 is a conceptual diagram illustrating a second exemplary embodiment of a frame transmission operation based on reception status information of a frame transmitted through a secondary channel.

A communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

As shown in FIG. 27, a communication node may acquire a first frame to be transmitted from the upper layer. If the primary channel is in the idle state, the communication node may identify whether the channels (e.g., primary channel and/or secondary channel) are occupied by monitoring the channels during a preset AIFS time period. Specifically, the communication node may identify whether the channels (e.g., primary channel and/or secondary channel) are occupied by monitoring the channels during the preset AIFS time period. For example, the communication node may monitor the primary channel by performing a PD operation on the primary channel, and may monitor the secondary channel by performing an ED operation on the secondary channel. The communication node may measure a signal strength of a frame received through the ED operation, and may estimate a distance from the communication node that transmitted the frame based on the signal strength. The MAC layer of the communication node may identify the result of ED sensing through the IPI-REPORT parameter in PHY-CCA. indication delivered from the PHY SAP or a parameter indicating the strength of the received signal.

As a result of the channel monitoring, if the primary channel is idle and the secondary channel is occupied by another communication node during the preset AIFS time period, the communication node may determine whether to use the secondary channel based on the reception status information of the frame occupying the secondary channel. For example, when an RSSI of the frame occupying the secondary channel is within a preset range, the communication node may determine that a distance from the communication node to another communication node exceeds a preset range. Therefore, even if the communication node performs fallback transmission of the frame through the 10 MHz primary channel, it may not interfere with other communication nodes using the secondary channel, and thus the communication node may perform fallback transmission of the frame through the primary channel. That is, the communication node may determine whether to use the secondary channel based on the channel occupancy state information of the channels and the reception status information of the frame. For example, when a channel occupancy ratio of the primary channel is within a preset range, the communication node may allow the fallback transmission of the frame through the primary channel. In addition, when the RSSI of the frame through the secondary channel is within a preset range, the communication node may perform fallback transmission of the frame through the primary channel.

In the present disclosure, the method of transmitting a frame using a plurality of channels may be applicable even when the plurality of channels are not contiguous. Alternatively, the multi-channel access method of the present disclosure may be applicable even when a plurality of channels are selected and used from the channels in the 2.4 GHz band, the channels in the 5 GHz band, and the channels in the 6 GHz band. According to the mobile communication technology, a channel may also be expressed as a link. That is, the channel access methods for using multiple channels, according to the present disclosure, may be applied to a channel access method for using multiple links.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a communication node including a logical link control (LLC) sublayer, a medium access control (MAC) layer, and a physical (PHY) layer, in a wireless communication network, the operation method comprising:
   receiving, by the MAC layer and from the LLC sublayer, information indicating a primary channel among the primary channel and a secondary channel;
   performing, by the MAC layer and the PHY layer, a first monitoring operation on each of the primary channel and the secondary channel while performing a first random backoff operation on the primary channel and the secondary channel;
   in response to determining that the primary channel is in an idle state and the secondary channel is in a busy state as a result of the first monitoring operation, performing, by the MAC layer and the PHY layer, a second random backoff operation on the primary channel; and
   in response to determining that the primary channel is in the idle state as a result of the second random backoff operation, performing, by the MAC layer and the PHY layer, fallback transmission of a first frame only through the primary channel having a 10 MHz bandwidth;
   wherein the first frame is a 10 MHz physical layer protocol data unit (PPDU); and
   wherein the information on the primary channel is included in a primitive received by the MAC sublayer from the LLC sublayer through a MAC-service access point (MAC-SAP).

2. The operation method according to claim 1, wherein the primitive is a MA-UNITDATA.request primitive.

3. The operation method according to claim 1, wherein the primary channel is a channel having a 10 MHz bandwidth, and the secondary channel is a channel having a 10 MHz bandwidth for extension of the primary channel, the secondary channel being contiguous with the primary channel.

4. The operation method according to claim 1, wherein in the performing of the first monitoring operation, the primary channel is determined to be in the busy state when a packet is decoded in the primary channel, and the secondary channel is determined to be in the busy state when an energy equal to or greater than a preset threshold is detected.

5. The operation method according to claim 4, wherein the first random backoff operation and the second random backoff operation share a same counter, and a counter value decreased during the first random backoff operation is used as an initial counter value for the second random backoff operation.

6. A communication node including a logical link control (LLC) sublayer, a medium access control (MAC) layer, and a physical (PHY) layer, in a wireless communication network, the communication node comprising:
   a processor; and
   a memory storing at least one instruction executable by the processor,
   wherein when executed by the processor, the at least one instruction is configured to:
      receive, by the MAC layer and from the LLC sublayer, information indicating a primary channel among the primary channel and a secondary channel;
      perform, by the MAC layer and the PHY layer, a first monitoring operation on each of the primary channel and the secondary channel while performing a first random backoff operation on the primary channel and the secondary channel;
      perform, by the MAC layer and the PHY layer, a second random backoff operation on the primary channel, in response to determining that the primary channel is in an idle state and the secondary channel is in a busy state as a result of the first monitoring operation; and
      perform, by the MAC layer and the PHY layer, fallback transmission of a first frame only through the primary channel having a 10 MHz bandwidth, in response to determining that the primary channel is in the idle state as a result of the second random backoff operation;

wherein the first frame is a 10 MHz physical layer protocol data unit (PPDU), and wherein the information on the primary channel is included in a primitive received by the MAC layer from the LLC sublayer through a MAC-service access point (MAC-SAP).

7. The communication node according to claim 6, wherein the primitive is a MA-UNITDATA.request primitive.

8. The communication node according to claim 6, wherein the primary channel is a channel having a 10 MHz bandwidth, and the secondary channel is a channel having a 10 MHz bandwidth for extension of the primary channel, the secondary channel being contiguous with the primary channel.

9. The communication node according to claim 6, wherein in the performing of the first monitoring operation, the primary channel is determined to be in the busy state when a packet is decoded in the primary channel, and the secondary channel is determined to be in the busy state when an energy equal to or greater than a preset threshold is detected.

10. The communication node according to claim 6, wherein the first random backoff operation and the second random backoff operation share a same counter, and a counter value decreased during the first random backoff operation is used as an initial counter value for the second random backoff operation.

* * * * *